US005642241A

United States Patent [19]
Kim

[11] Patent Number: 5,642,241
[45] Date of Patent: Jun. 24, 1997

[54] DIGITAL SIGNAL RECORDING APPARATUS IN WHICH INTERLEAVED-NRZI MODULATED IS GENERATED WITH A LONE 2T PRECODER

[75] Inventor: Soon-tae Kim, Kumi, Rep. of Korea

[73] Assignee: Samsung Electronics Co., Ltd., Suwon, Rep. of Korea

[21] Appl. No.: 506,041

[22] Filed: Jul. 24, 1995

[30] Foreign Application Priority Data

Oct. 31, 1994 [KR] Rep. of Korea ............ 94-28376

[51] Int. Cl.⁶ .......................... G11B 5/09; G11B 20/14; G11B 20/16
[52] U.S. Cl. .................... 360/41; 360/45; 375/242
[58] Field of Search .................. 360/40, 41, 19.1, 360/45, 46, 48; 341/59, 58; 358/341, 335; 370/84; 375/375, 242, 244, 253; 395/375

[56] References Cited

U.S. PATENT DOCUMENTS 4,520,346  5/1985  Shimada .................. 360/40 X
5,432,651  7/1995  Maeno et al. ................ 360/41
5,490,181  2/1996  Shimotashiro et al. ........ 375/375

Primary Examiner—W. C. Kim
Assistant Examiner—Patrick Wamsley
Attorney, Agent, or Firm—Allen LeRoy Limberg

[57] ABSTRACT

A lone precoder of 2T type generates interleaved non-return to-zero, invert-on-ONEs (I-NRZI) modulation for digital signal recording apparatus used for recording in parallel tracks on a record medium, the interleaved codes providing for the inclusion of pilot signals in selected sets of recording tracks. A first set of NRZI codes is generated directly by the precoder, and a second set of NRZI codes is generated by bit-complementing odd bit places of the first set of NRZI codes. Preferably the lone 2T precoder is one that performs its coding of each information word on a parallel-bit basis, to implement pipeline processing of the generation of I-NRZI modulation, and to avoid the need for intermittently written or intermittently read buffer storage. The digital signal recording apparatus is suited for the recording of television signals, with pilot signals being included on the tracks when sync and run-up data are recorded, as well as when video and audio data are recorded.

30 Claims, 19 Drawing Sheets

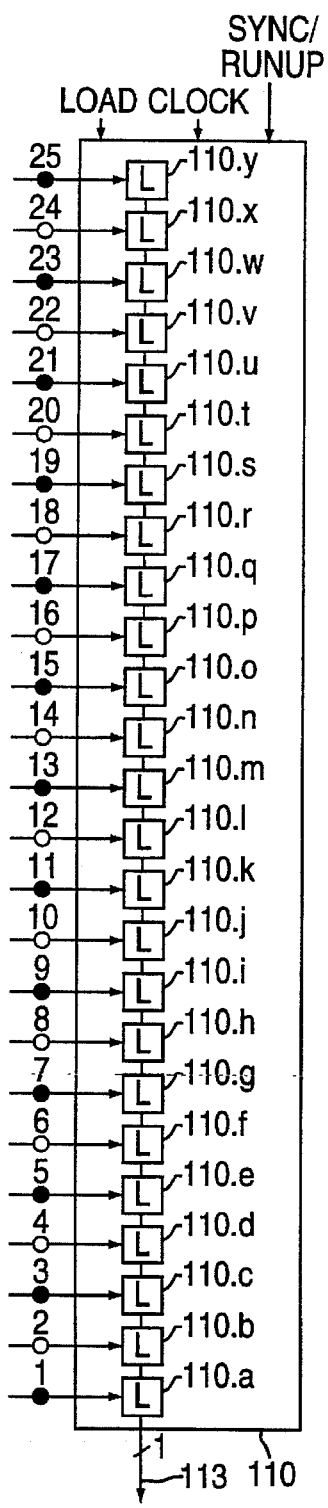
FIG. 9B  FIG. 9C  FIG. 9D

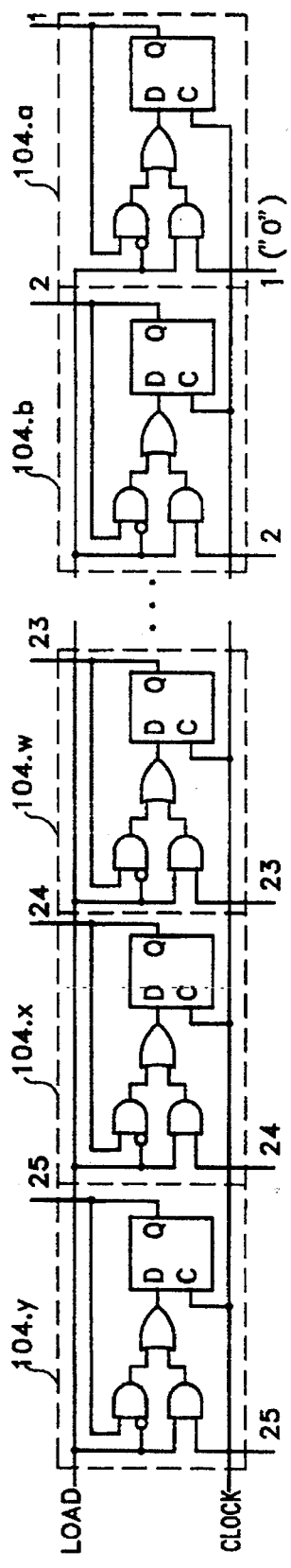
FIG. 11
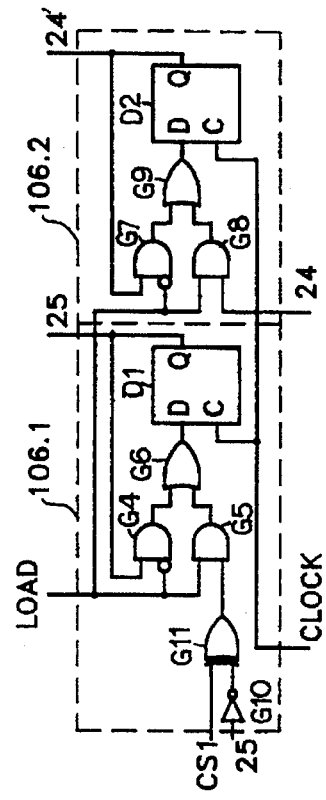
FIG. 12B
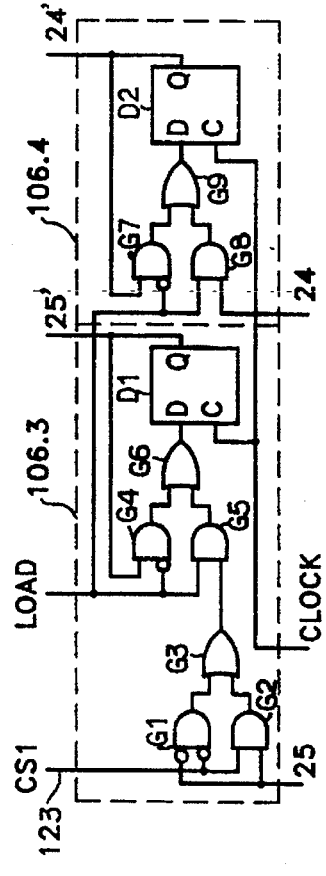
FIG. 12A
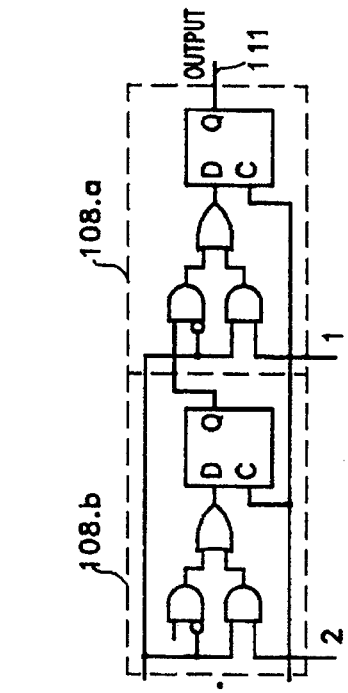
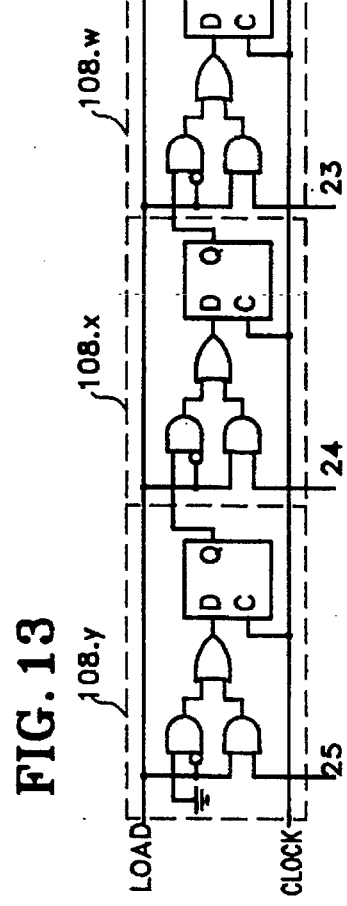
FIG. 13

FIG. 17B

| | ADDRESS | DATA |
|---|---|---|
| 0 | 0,0000 | 90A |
| 1 | 0,0001 | 90B |
| 2 | 0,0010 | 90C |
| 3 | 0,0011 | 90D |
| 4 | 0,0100 | 90E |
| 5 | 0,0101 | 90F |
| 6 | 0,0110 | 90G |
| 7 | 0,0111 | 90H |
| 8 | 0,1000 | 90I |
| 9 | 0,1001 | 90J |
| 10 | 0,1010 | 90K |
| 11 | 0,1011 | 90L |
| 12 | 0,1100 | 90M |
| 13 | 0,1101 | 90N |
| 14 | 0,1110 | 90O |
| 15 | 0,1111 | 90Q |
| 16 | 1,0000 | 90R |

FIG. 19A

| | ADDRESS | DATA | | ADDRESS | DATA | | ADDRESS | DATA | | ADDRESS | DATA |
|---|---|---|---|---|---|---|---|---|---|---|---|
| 0 | 00,0000,0000 | D0 | 25 | 00,0001,1001 | D4 | 50 | 00,0011,0010 | -D9 | | | |
| 1 | 00,0000,0001 | D2 | 26 | 00,0001,1010 | D2 | 51 | 00,0011,0011 | -D7 | | | |
| 2 | 00,0000,0010 | D4 | 27 | 00,0001,1011 | D0 | 52 | 00,0011,0100 | -D5 | | | |
| 3 | 00,0000,0011 | D6 | 28 | 00,0001,1100 | -D1 | 53 | 00,0011,0101 | -D3 | | | |
| 4 | 00,0000,0100 | D8 | 29 | 00,0001,1101 | -D3 | 54 | 00,0011,0110 | -D1 | | | |
| 5 | 00,0000,0101 | D10 | 30 | 00,0001,1110 | -D5 | 55 | 00,0011,0111 | D0 | • | • | • |
| 6 | 00,0000,0110 | D12 | 31 | 00,0001,1111 | -D7 | 56 | 00,0011,1000 | D2 | • | • | • |
| 7 | 00,0000,0111 | D14 | 32 | 00,0010,0000 | -D9 | 57 | 00,0011,1001 | D4 | • | • | • |
| 8 | 00,0000,1000 | D13 | 33 | 00,0010,0001 | -D11 | 58 | 00,0011,1010 | D6 | | | |
| 9 | 00,0000,1001 | D11 | 34 | 00,0010,0010 | -D13 | 59 | 00,0011,1011 | D8 | | | |
| 10 | 00,0000,1010 | D9 | 35 | 00,0010,0011 | -D14 | 60 | 00,0011,1100 | D10 | | | |
| 11 | 00,0000,1011 | D7 | 36 | 00,0010,0100 | -D12 | 61 | 00,0011,1101 | D12 | | | |
| 12 | 00,0000,1100 | D5 | 37 | 00,0010,0101 | -D10 | 62 | 00,0011,1110 | D14 | | | |
| 13 | 00,0000,1101 | 0 | 38 | 00,0010,0110 | 0 | 63 | 00,0011,1111 | 0 | 588 | 10,0100,1100 | 0 |
| 14 | 00,0000,1110 | 0 | 39 | 00,0010,0111 | 0 | 64 | 00,0100,0000 | 0 | 589 | 10,0100,1101 | 0 |
| 15 | 00,0000,1111 | 0 | 40 | 00,0010,1000 | 0 | 65 | 00,0100,0001 | 0 | 590 | 10,0100,1110 | 0 |
| 16 | 00,0001,0000 | 0 | 41 | 00,0010,1001 | 0 | 66 | 00,0100,0010 | 0 | 591 | 10,0100,1111 | 0 |
| 17 | 00,0001,0001 | 0 | 42 | 00,0010,1010 | 0 | 67 | 00,0100,0011 | 0 | 592 | 10,0101,0000 | 0 |
| 18 | 00,0001,0010 | 0 | 43 | 00,0010,1011 | 0 | 68 | 00,0100,0100 | 0 | 593 | 10,0101,0001 | 0 |
| 19 | 00,0001,0011 | 0 | 44 | 00,0010,1100 | 0 | 69 | 00,0100,0101 | 0 | 594 | 10,0101,0010 | 0 |
| 20 | 00,0001,0100 | 0 | 45 | 00,0010,1101 | 0 | 70 | 00,0100,0110 | 0 | 595 | 10,0101,0011 | 0 |
| 21 | 00,0001,0101 | 0 | 46 | 00,0010,1110 | 0 | 71 | 00,0100,0111 | 0 | 596 | 10,0101,0100 | 0 |
| 22 | 00,0001,0110 | 0 | 47 | 00,0010,1111 | 0 | 72 | 00,0100,1000 | 0 | 597 | 10,0101,0101 | 0 |
| 23 | 00,0001,0111 | 0 | 48 | 00,0011,0000 | 0 | 73 | 00,0100,1001 | 0 | 598 | 10,0101,0110 | 0 |
| 24 | 00,0001,1000 | 0 | 49 | 00,0011,0001 | 0 | 74 | 00,0100,1010 | 0 | 599 | 10,0101,0111 | 0 |

FIG. 19B

| | ADDRESS | DATA | | ADDRESS | DATA | | ADDRESS | DATA | | ADDRESS | DATA |
|---|---|---|---|---|---|---|---|---|---|---|---|
| 0 | 00,0000,0000 | D1 | 25 | 00,0001,1001 | D3 | 50 | 00,0011,0010 | -D8 | | | |
| 1 | 00,0000,0001 | D3 | 26 | 00,0001,1010 | D1 | 51 | 00,0011,0011 | -D6 | | | |
| 2 | 00,0000,0010 | D5 | 27 | 00,0001,1011 | -D0 | 52 | 00,0011,0100 | -D4 | | | |
| 3 | 00,0000,0011 | D7 | 28 | 00,0001,1100 | -D2 | 53 | 00,0011,0101 | -D2 | | | |
| 4 | 00,0000,0100 | D9 | 29 | 00,0001,1101 | -D4 | 54 | 00,0011,0110 | -D0 | | | |
| 5 | 00,0000,0101 | D11 | 30 | 00,0001,1110 | -D6 | 55 | 00,0011,0111 | D1 | • | • | • |
| 6 | 00,0000,0110 | D13 | 31 | 00,0001,1111 | -D8 | 56 | 00,0011,1000 | D3 | • | • | • |
| 7 | 00,0000,0111 | D14 | 32 | 00,0010,0000 | -D10 | 57 | 00,0011,1001 | D5 | • | • | • |
| 8 | 00,0000,1000 | D12 | 33 | 00,0010,0001 | -D12 | 58 | 00,0011,1010 | D7 | | | |
| 9 | 00,0000,1001 | D10 | 34 | 00,0010,0010 | -D14 | 59 | 00,0011,1011 | D9 | | | |
| 10 | 00,0000,1010 | D8 | 35 | 00,0010,0011 | -D13 | 60 | 00,0011,1100 | D11 | | | |
| 11 | 00,0000,1011 | D6 | 36 | 00,0010,0100 | -D11 | 61 | 00,0011,1101 | D13 | | | |
| 12 | 00,0000,1100 | 0 | 37 | 00,0010,0101 | 0 | 62 | 00,0011,1110 | 0 | | | |
| 13 | 00,0000,1101 | 0 | 38 | 00,0010,0110 | 0 | 63 | 00,0011,1111 | 0 | 588 | 10,0100,1100 | 0 |
| 14 | 00,0000,1110 | 0 | 39 | 00,0010,0111 | 0 | 64 | 00,0100,0000 | 0 | 589 | 10,0100,1101 | 0 |
| 15 | 00,0000,1111 | 0 | 40 | 00,0010,1000 | 0 | 65 | 00,0100,0001 | 0 | 590 | 10,0100,1110 | 0 |
| 16 | 00,0001,0000 | 0 | 41 | 00,0010,1001 | 0 | 66 | 00,0100,0010 | 0 | 591 | 10,0100,1111 | 0 |
| 17 | 00,0001,0001 | 0 | 42 | 00,0010,1010 | 0 | 67 | 00,0100,0011 | 0 | 592 | 10,0101,0000 | 0 |
| 18 | 00,0001,0010 | 0 | 43 | 00,0010,1011 | 0 | 68 | 00,0100,0100 | 0 | 593 | 10,0101,0001 | 0 |
| 19 | 00,0001,0011 | 0 | 44 | 00,0010,1100 | 0 | 69 | 00,0100,0101 | 0 | 594 | 10,0101,0010 | 0 |
| 20 | 00,0001,0100 | 0 | 45 | 00,0010,1101 | 0 | 70 | 00,0100,0110 | 0 | 595 | 10,0101,0011 | 0 |
| 21 | 00,0001,0101 | 0 | 46 | 00,0010,1110 | 0 | 71 | 00,0100,0111 | 0 | 596 | 10,0101,0100 | 0 |
| 22 | 00,0001,0110 | 0 | 47 | 00,0010,1111 | 0 | 72 | 00,0100,1000 | 0 | 597 | 10,0101,0101 | 0 |
| 23 | 00,0001,0111 | 0 | 48 | 00,0011,0000 | 0 | 73 | 00,0100,1001 | 0 | 598 | 10,0101,0110 | 0 |
| 24 | 00,0001,1000 | 0 | 49 | 00,0011,0001 | 0 | 74 | 00,0100,1010 | 0 | 599 | 10,0101,0111 | 0 |

DIGITAL SIGNAL RECORDING APPARATUS IN WHICH INTERLEAVED-NRZI MODULATED IS GENERATED WITH A LONE 2T PRECODER

The present invention relates to digital signal recording apparatus recording interleaved non-return-to-zero, invert-on-ONEs (I-NRZI) modulation that includes pilot signals used for head tracking during playback.

BACKGROUND OF THE INVENTION

In a magnetic recording/reproducing apparatus such as a videocassette recorder, as a head deviates from a track on a magnetic recording medium during playback, head output is decreased and errors increase. This precludes the normal reproduction of an image, so it is required for the head to trace a target track precisely. In other words, it is necessary to maintain head tracking. In order to extend recording time in a digital videocassette recorder for home use, tracks are especially narrow, which increases the precision of the head tracking needed for satisfactory reproduction of images. Among the methods for detecting head tracking error, or deviation from ideal tracking, are methods that use different respective pilot signals for successive tracks to facilitate comparison of the crosstalk of the pilot signals from the tracks preceding and succeeding the track being most closely followed by the head, thus to detect whether the head tracking deviates toward the preceding track or toward the succeeding track. The pilot signals take the form of peaks and notches in the frequency spectra of the digital signals recorded on the tracks by selectively recording one of two types of interleaved non-return to-zero, invert-on-ONEs (I-NRZI) modulation. The same information is precoded into two parallel-in-time sets of serially supplied channel words; and the channel words that are selected from one or the other of the sets to control I-NRZI modulation during recording, are selected so the I-NRZI modulation will deviate least from the pilot signal criterion for each recording track. When the selection of the channel word is completed, precoding information stored in the precoder that did not generate the selected channel word is altered, to conform to precoding information stored in the precoder that did generate the selected channel word. This is done to provide continuity of the precoding procedures and of the decoding procedures subsequent to the I-NRZI modulation being recovered from the recording medium during playback and demodulated. When the selection of the channel word is completed, integrators in the circuitry for determining which channel word is to be selected have to have their contents updated to reflect which channel word was in fact selected for recording. Such methods are described in U.S. Pat. No. 5,142,421 issued 25 Aug. 1992 to Kahlman et alii, entitled "DEVICE FOR RECORDING A DIGITAL INFORMATION SIGNAL ON A RECORD CARRIER" and incorporated herein by reference.

In Kahlman et alii the generation of the I-NRZI modulation is done on a serial-bit basis. This does not lend itself to pipeline operation in which channel words selected from the serial-bit precoders are recorded on the magnetic recording medium, after some fixed delay to accommodate the selection circuitry. It takes some time after a pair of respective channel words are generated, for a decision procedure that determines which of them will be recorded. After the decision procedure, it then takes some further time for updating stored information in the precoders. After the decision procedure, it then takes some further time for updating stored information in the precoders. These decision and updating procedures must be completed before further precoding is possible, so the delays caused by these decision and updating procedures introduce gaps into the continuous flow of bits as regularly clocked by synchronous clocking methods. Accordingly, first-in/first-out buffer storage that can be intermittently read from has to be provided before the serial-bit precoders; and first-in/first-out buffer storage that can be intermittently written with the selected channel words and subsequently continuously read from has to be provided for channel words generated by the serial-bit precoders. The generation of clocking signals for the buffer storage is somewhat complex, so it is desired to avoid the need for intermittently written or intermittently read buffer storage.

A application entitled DIGITAL SIGNAL RECORDING APPARATUS filed 7 Jun. 1995 by the inventor is included herein by reference, as non-essential subject matter. In this previously filed application the inventor, Soon-Tae Kim, describes using parallel-bit precoders together with parallel-bit-to-serial-bit (P/S) converters, to implement pipeline processing of the generation of I-NRZI modulation and to avoid the need for intermittently written or intermittently read buffer storage. The precoding procedures in the initial steps of the generation of I-NRZI modulation are generally carried out using first and second precoders of 2T type, to generate in parallel the two sets of channel words from which the channel words are selected for recording. As Kahlman et alii point out, when single-bit prefixes are affixed to the information words precoded by first and second precoders of 2T type, the corresponding odd bit-places in the respective channel words they concurrently generate are bit complements of each other, and the corresponding even bit-places in these channel words are the same. This property is used to reduce the amount of parallel-bit-to-serial-bit conversion required after first and second parallel-bit precoders of 2T type, in certain of the digital signal recording apparatus described in the inventor's above-referenced concurrent patent application.

In embodiments of the inventions described herein, this property is exploited for generating I-NRZI modulation, using a lone precoder of 2T type to generate the first of a pair of concurrent channel words and generating the second channel word of the pair from the first by bit-complementing its odd bit-places and retaining its even bit-places unchanged. It is particularly attractive to use a lone precoder of 2T type when the precoding is done on a parallel-bit basis, since there are a considerable number of exclusive-OR gates and a considerable number of bit latches in a parallel-bit precoder of 2T type, as described in the inventor's above-referenced concurrent patent application.

SUMMARY OF THE INVENTION

The invention is embodied in digital signal recording apparatus which generates interleaved non-return to-zero, invert-on-ONEs (I-NRZI) modulation using a lone precoder of 2T type. In preferred embodiments of the invention the lone 2T precoder is one that performs its coding of each information word on a parallel-bit basis, to implement pipeline processing of the generation of I-NRZI modulation, and to avoid the need for intermittently written or intermittently read buffer storage.

In certain embodiments of the invention, used to record television signals, provision is made for the made for generating I-NRZI modulation using the same precoder of 2T type for sync and run-up information as for video and audio information. The pilot signals introduced while recording video and audio information are continued through the recording of sync and run-up information.

BRIEF DESCRIPTION OF THE DRAWING

FIG. 9 is an assembly drawing indicated how the two sheets on which FIGS. 9A, 9B, 9C and 9D appear can be juxtaposed for viewing.

Figure 8:
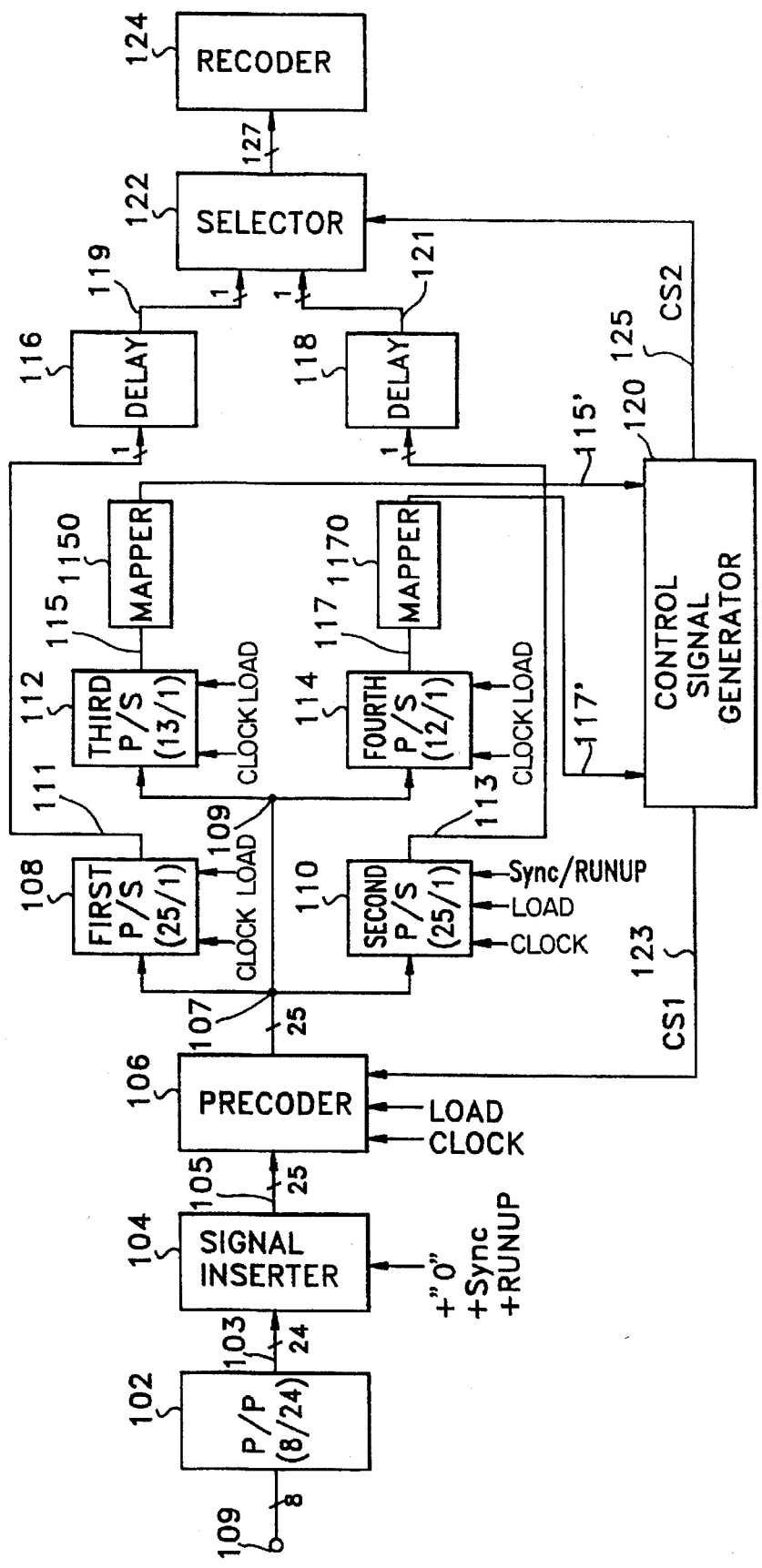
FIG. 8 is a block diagram a digital signal recording apparatus embodying the present invention.

Each of FIGS. 9B, 9C and 9D is a detailed block diagram of another parallel-to-serial converter used in the FIG. 8 digital signal recording apparatus.

FIGS. 10A–10I illustrate the patterns of sync data and run-up data.

FIG. 11 is a detailed circuit diagram of the signal inserter shown in FIG. 9.

FIGS. 12A and 12B are detailed circuit diagrams of part of the precoder shown in FIG. 9.

FIG. 13 is a detailed circuit diagram of the first parallel-to-serial converter shown in FIG. 9.

Figure 14:
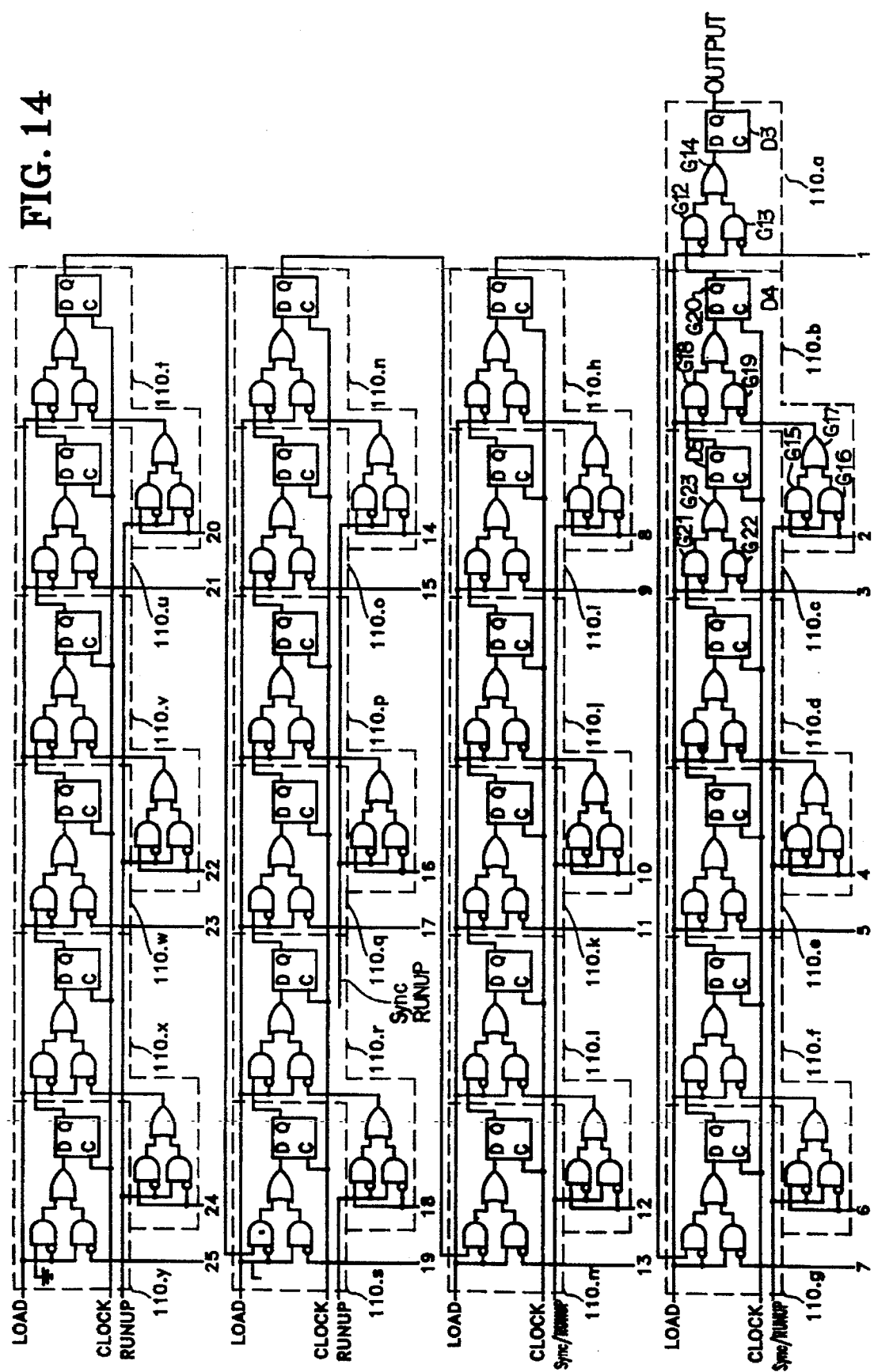

FIG. 14 is a detailed circuit diagram of the second parallel-to-serial converter shown in FIG. 9.

FIGS. 15A–15I illustrate operation waveforms for various blocks shown in FIGS. 8 and 9.

Figure 16:
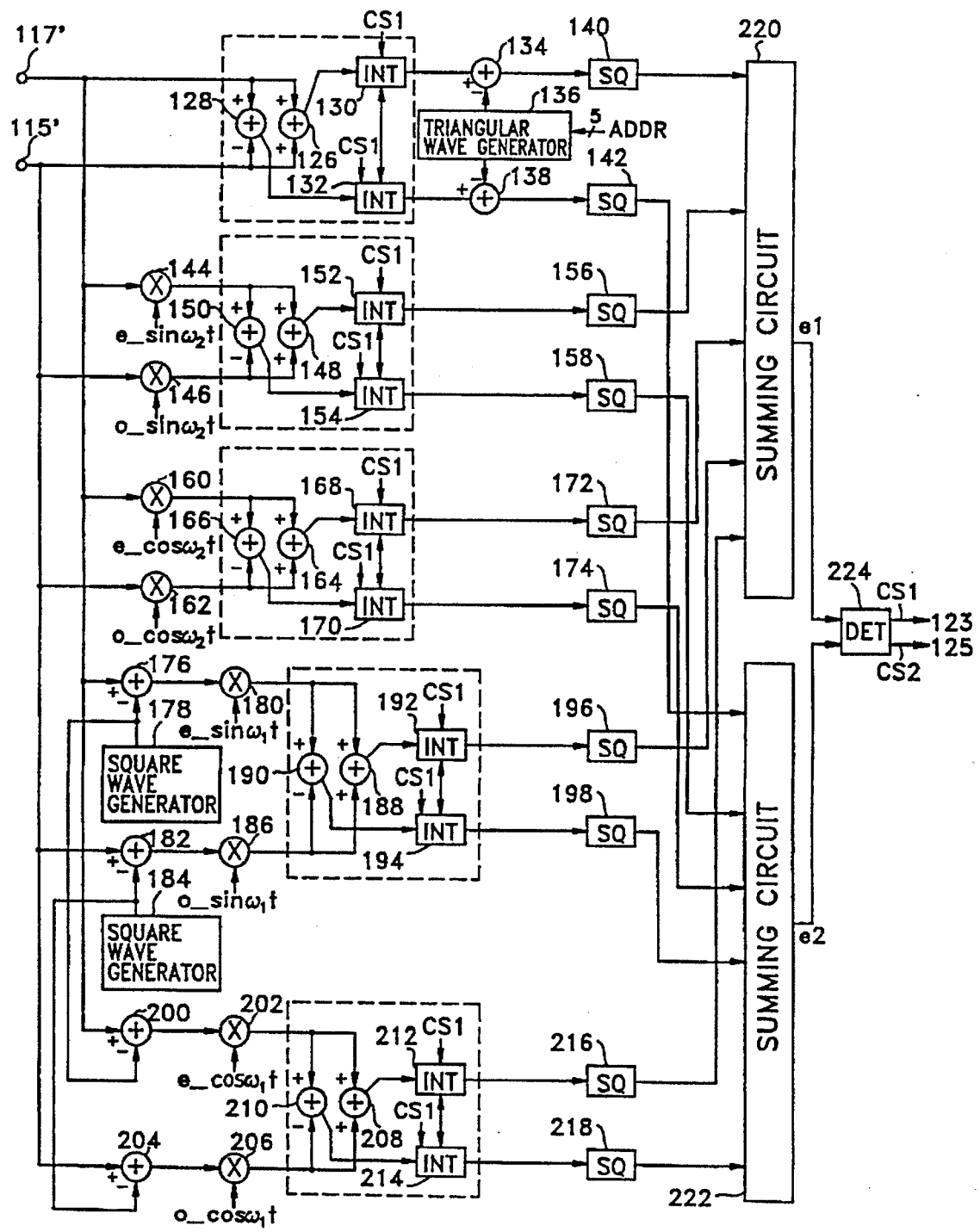

FIG. 16 is a detailed circuit diagram of the control signal generator shown in FIG. 8.

Figure 17A:
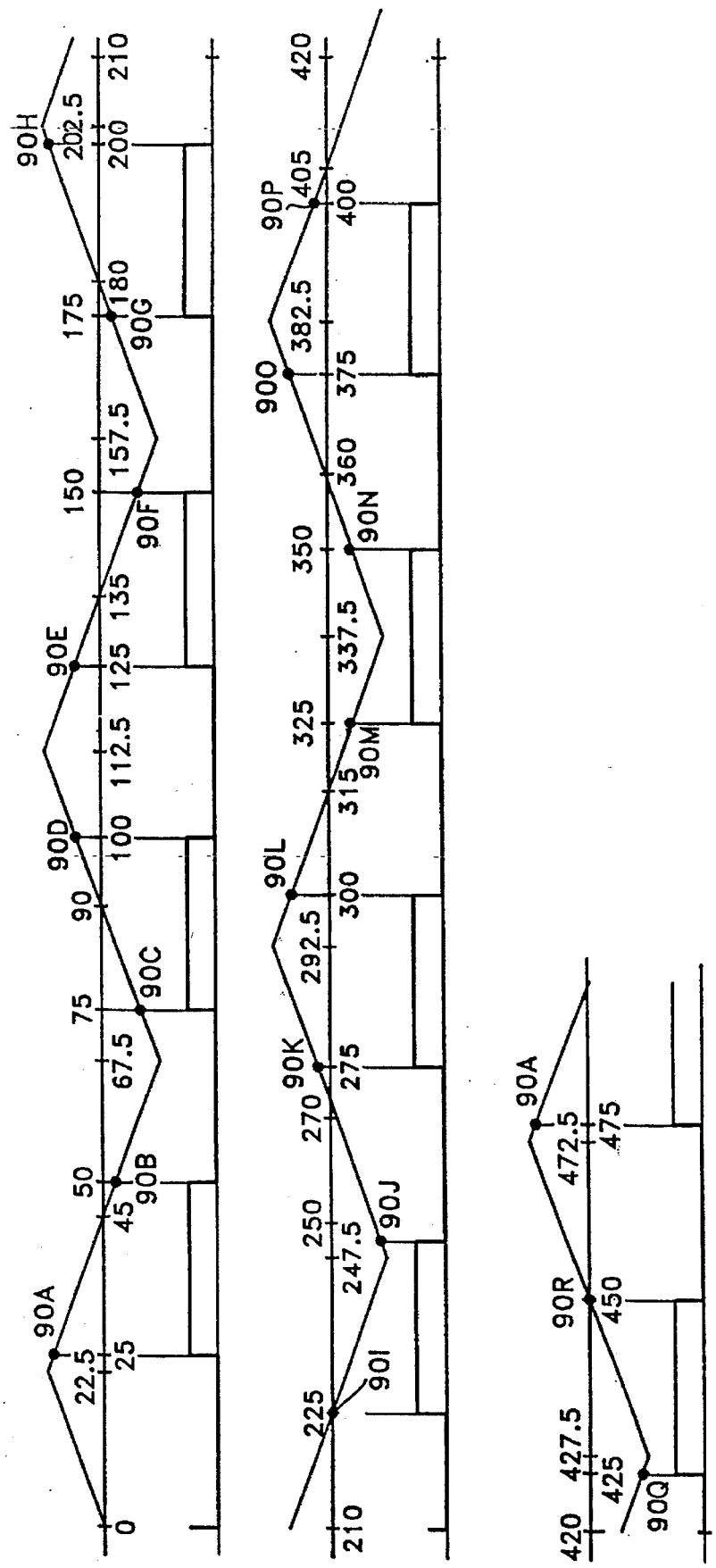

FIGS. 17A and 17B illustrate a triangular wave signal generated by the triangular wave generator shown in FIG. 16.

Figure 18A:
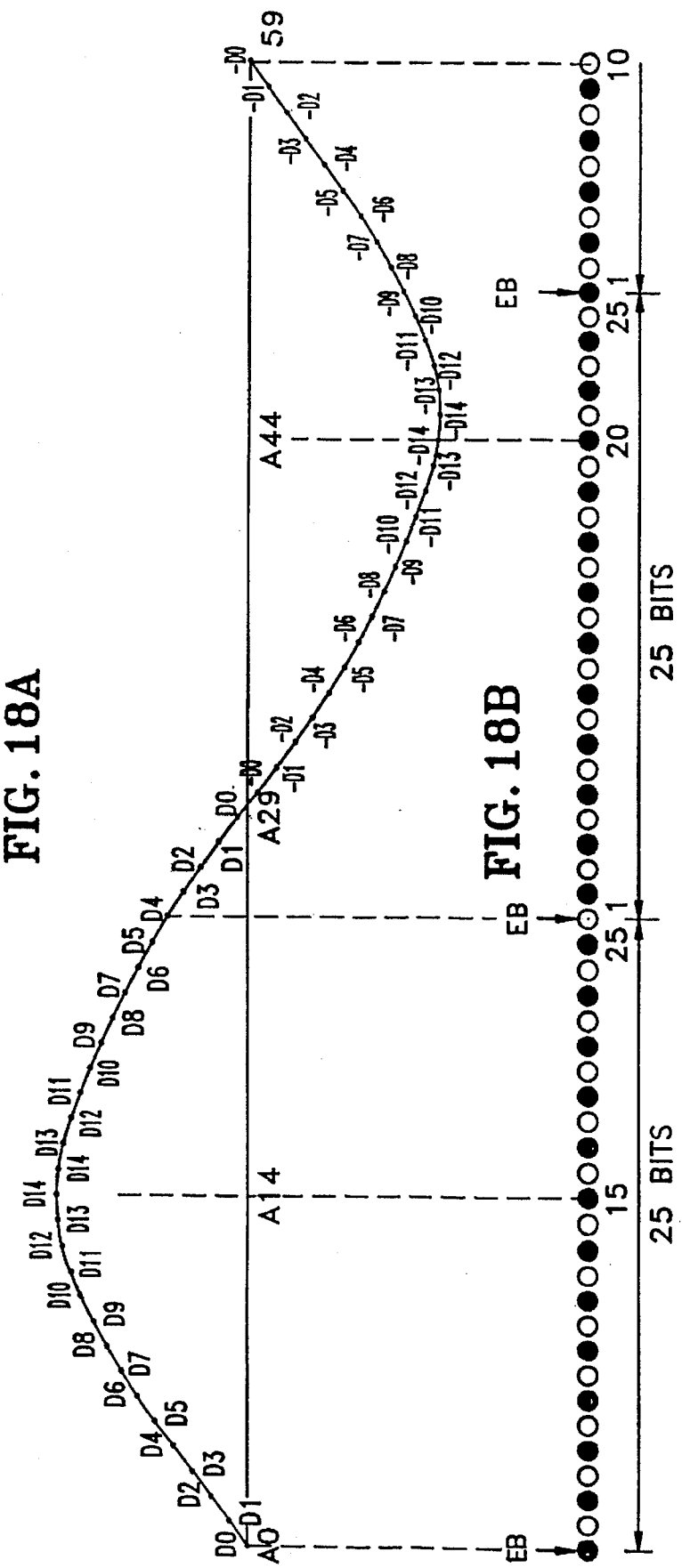
Figure 18B:
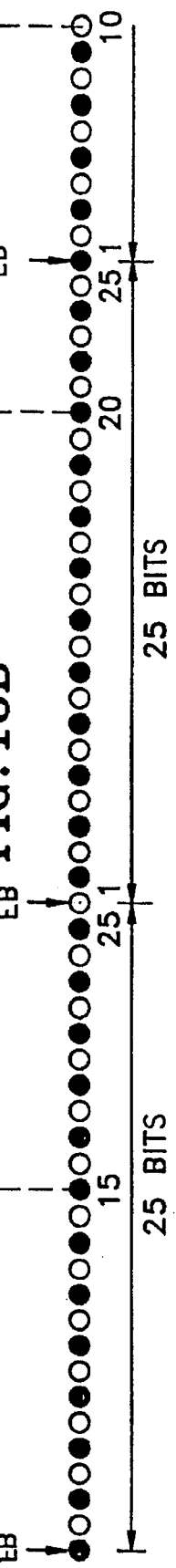
Figure 18C:

FIGS. 18A, 18B and 18C illustrate a sine wave signal and square wave signal used in the FIG. 16 control signal generator.

FIGS. 19A and 19B are examples of an odd-sample sine table and an even-sample sine table for storing samples of the sine wave signal shown in FIG. 18A.

Figure 20A:
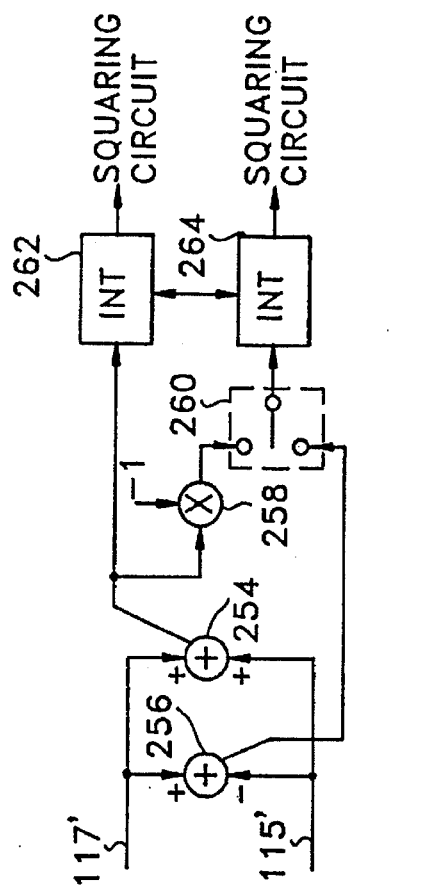
Figure 20B:
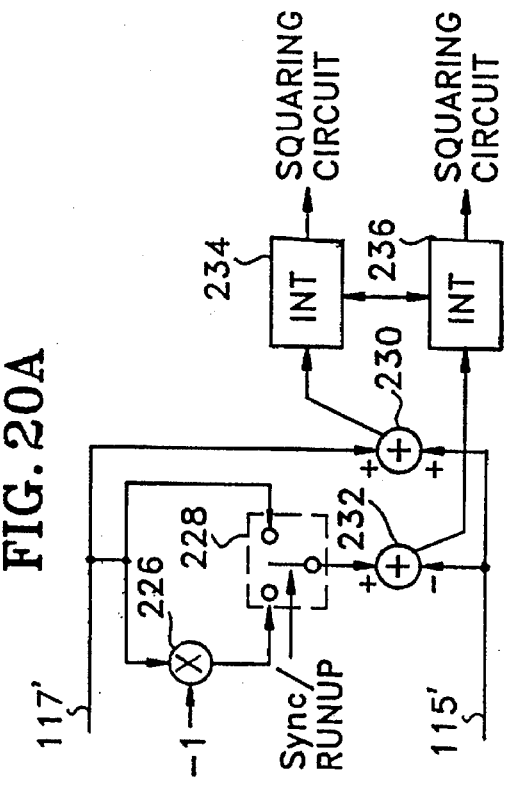
Figure 20C:
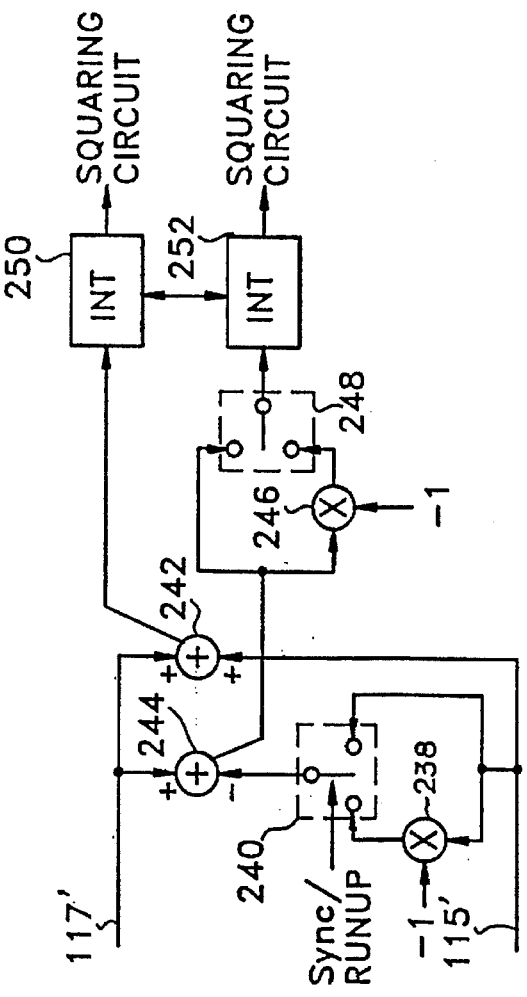

FIGS. 20A, 20B and 20C are examples of alternative implementations of the circuitry within the dashed-line rectangles of FIG. 16.

DETAILED DESCRIPTION OF THE INVENTION

Figure 1:
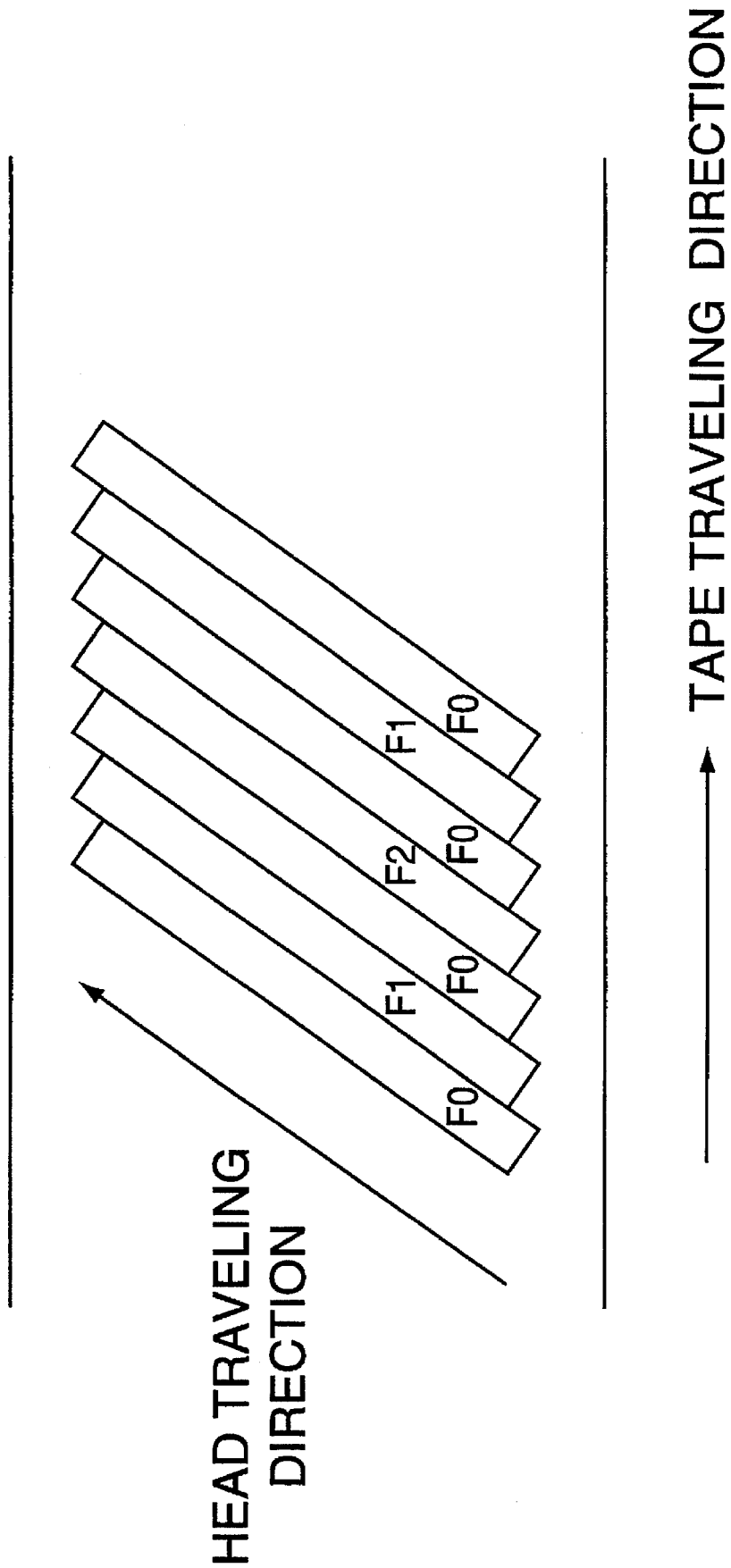
FIG. 1 depicts an illustrative pattern for recording a serial data stream of channel words on adjacent parallel tracks within the surface of a magnetic recording medium.

FIG. 1 illustrates how, in order to facilitate head tracking, helical-scan digital recording apparatus records a serial data stream of channel words in three spectral response patterns F0, F1 and F2 on successive parallel tracks of a magnetic recording medium. Per convention, the tracks are shown shorter in length and more skewed from the direction of tape travel than is the actual case. Pilot signals appear in the spectra of digital signals recorded in the sequence of F0, F1, F0, F2, ... on the respective tracks of the magnetic recording medium. The pilot signals take the form of notches or peaks at prescribed frequencies that are introduced into the frequency-domain spectral energy response (Fourier transform) of the signals recorded on the tracks. When playing back from any one of these tracks of a particular pattern, certain deviations of the frequency-domain spectral energy response from expected values is ascertained. Such deviations are ascribed to pick-up of the digital signals from the preceding and succeeding tracks, in order to estimate the relative proximity of the head to the preceding track and to the succeeding track, from which the tracking error of the head can be determined. The illustrated sequential pattern F0, F1, F0, F2 is merely exemplary, since in practice the number of patterns and the recording sequence can be different from that of the illustration. U.S. Pat. No. 5,142,421 describes certain of these variants.

Figure 2A:
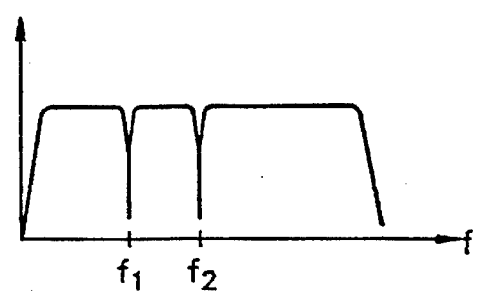
FIGS. 2A, 2B and 2C illustrate frequency spectra associated with the patterns shown in FIG. 1.
Figure 2B:
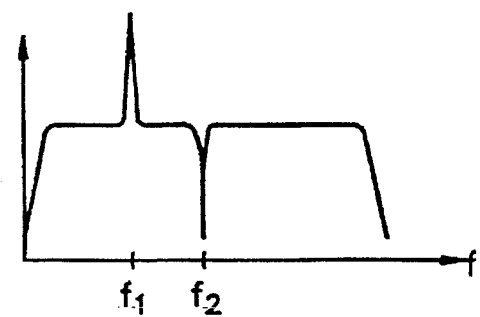
Figure 2C:
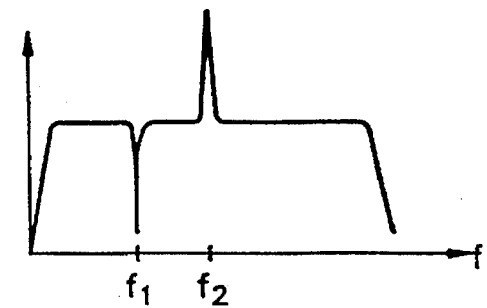

FIGS. 2A, 2B and 2C illustrate the frequency spectra of the serial-bit data streams of channel words bearing patterns F0, F1 and F2 shown in FIG. 1, respectively. In the frequency spectrum of the pattern F0, there are notches at frequencies $f_1$ and $f_2$ where the spectral energy is relatively small. In the frequency spectrum of the pattern F1, there is a pilot signal (peak) at frequency $f_1=\omega_1/2\pi$ where the spectral energy is relatively large, and there is a notch at frequency $f_2=\omega_2/2\pi$ where the spectral energy is relatively small. In the frequency spectrum of the pattern F2, there is a notch at frequency $f_1$ where the spectral energy is relatively small and a pilot signal (peak) at frequency $f_2$ where the spectral energy is relatively large.

During the playback of the pattern F0, a crosstalk effect between pilot signals (peaks $f_1$ and $f_2$) of the patterns F1 and F2 of adjacent tracks is used to determine tracking error. On one hand, if the head deviates from the center of the pattern F0 toward the pattern F1, the crosstalk of pilot signal from the pattern F1 becomes greater than that from the pattern F2. As a result, frequency component $f_1$ of a playback signal becomes greater and frequency component $f_2$ becomes smaller. On the other hand, if the head deviates from the center of the pattern F0 toward the pattern F2, the crosstalk of pilot signal from the pattern F2 becomes greater than that from the pattern F1. As a result, on average, frequency component $f_2$ of a playback signal becomes greater and frequency component $f_1$ becomes smaller. When playing back the pattern F0, then, comparing the average spectral energy of the playback signal at frequencies $f_1$ and $f_2$ enables the detection of deviation of head tracking. Using this result, precise tracking is made possible by controlling the height of a head element with a voltage applied to a piezo-electric element the head is mounted on, or by controlling the traveling speed of the magnetic recording medium (tape).

Figure 3:
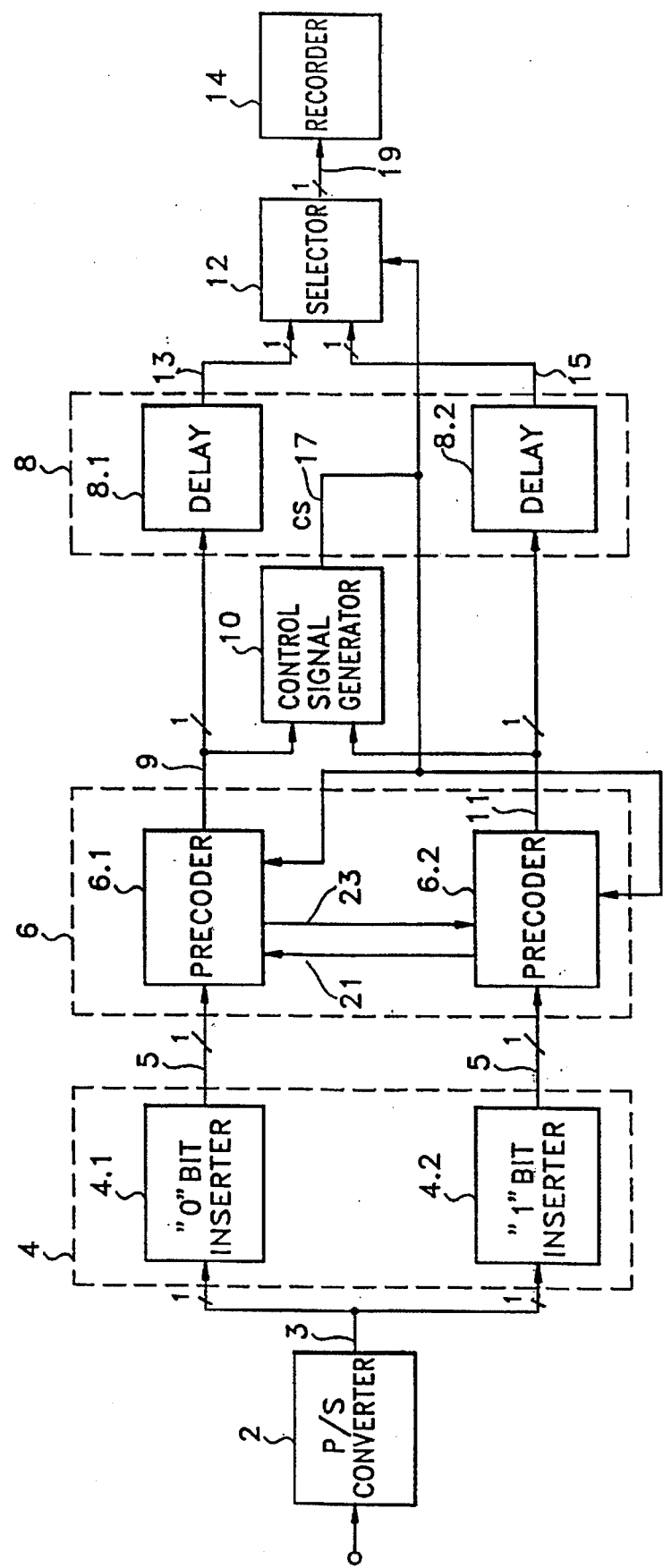
FIG. 3 is a block diagram of prior-art digital signal recording apparatus described in U.S. Pat. No. 5,142,421.

FIG. 3 is a block diagram of a digital signal recording apparatus disclosed in U.S. Pat. No. 5,142,421 issued 25 Aug. 1992 to Kahlman et alii, entitled "DEVICE FOR RECORDING A DIGITAL INFORMATION SIGNAL ON A RECORD CARRIER" and incorporated herein by reference. The schematic configuration and operation thereof will be described in regard to the conventional method for recording the patterns F0, F1 and F2.

In FIG. 3, 8-parallel-bit digital words are supplied via an input port 1 to a parallel-to-serial (P/S) converter 2. The P/S converter 2 converts, for instance, each succeeding group of three 8-parallel-bit digital words into a single 24-serial-bit digital information word supplied via a converter output port 3. A signal inserter 4 includes a "0" bit inserter 4.1 and a "1" bit inserter 4.2 each receiving as respective input signal the stream of 24-serial-bit digital information words appearing at the output port 3 of the P/S converter 2. The "0" bit inserter 4.1 inserts a single-bit digital prefix consisting of a "0" before the most significant bit (MSB) of each 24-serial-bit information word to generate a respective 25-serial-bit "positive" information word supplied from an output port 5 of the "0" bit inserter 4.1. The "1" bit inserter 4.2 inserts a single-bit digital prefix consisting of a "1" before the most significant bit (MSB) of each 24-serial-bit information word to generate a respective 25-serial-bit "negative" information word supplied from an output port 7 of the "1" bit inserter 4.2.

An encoder 6 includes a precoder 6.1 converting the "positive" information words to respective 25-serial-bit channel words supplied via a connection 9. The encoder 6 further includes a precoder 6.2 converting the "negative" information words to respective 25-serial-bit channel words supplied via a connection 11. In the remainder of this specification and in the claims appended to this specification, in order to distinguish between the channel words supplied from the precoder 6.1 and the channel words supplied from the precoder 6.2, the channel words supplied from the precoder 6.1 are referred to as "positive"-information channel words; and the channel words supplied from the precoder 6.2 are referred to as "negative"-information channel words. If the precoders 6.1 and 6.2 are 2T precoders, the single-bit prefix code causes them to generate two 25 serial-bit channel words in which the corresponding even bits are the same, and the corresponding odd bits are bit-complementary. A 2T precoder comprises a two-input exclusive-OR gate and a two-stage shift register providing an integrating feedback connection from the output connection of the exclusive-OR gate to a first of its input connections. The exclusive-OR gate receives the precoder input signal at its second input connection, supplies the precoder output signal at its output connection, and normally receives at its first input connection the precoder output signal as delayed 2T by passage through the two-stage shift register. The interval T is the sampling interval of the precoder input signal and the interval between clocked shifts of bits through the two-stage shift register. The feedback connection of the exclusive-OR gate provided by the two-stage shift register is referred to as the "integrating feedback connection" or simply the "integrating connection".

The precoder 6.1 supplies 25-serial-bit "positive"-information channel words via the connection 9 as its output signal; and the precoder 6.2 supplies 25-serial-bit "negative"-information channel words via the connection 11 as its output signal. Based on these 25-serial-bit channel words supplied in parallel from the precoders 6.1 and 6.2, a control signal generator 10 compares the respective frequency-domain spectral energy characteristics of each word to the prescribed spectral energy characteristics for the track that is to be recorded by a digital recorder 14 to determine which channel word deviates the least from the prescribed spectral response. The control signal generator 10 generates a control signal CS indicative of which of the channel words supplied from the precoders 6.1 and 6.2 deviates the least from the prescribed spectral response and should be selected for recording. Control signal CS is supplied via a connection 17 to the selection control port of a selector 12, which selects the output signal from one of the precoders 6.1 and 6.2 (as delayed by a time compensator 8) that deviates the least from the prescribed spectral response, for application to the digital tape recorder 14. Delays 8.1 and 8.2 of the time compensator 8 are needed to compensate for the time necessary for the control signal generator 10 to generate control signal CS for application to the selector 12. The control signal CS is also supplied via the connection 17 to respective control ports of the precoders 6.1 and 6.2 to control the transfer of the contents of the shift register in the one of the precoders 6.1 and 6.2 the output from which is selected for recording to the shift register in the other of the precoders 6.1 and 6.2, to provide for continuity of coding.

The selector 12 receives via a connection 13 the "positive"-information output of the precoder 6.1 as delayed by the delay 8.1 and receives via a connection 15 the "negative"-information output of the precoder 6.2 as delayed by the delay 8.2. In response to the control signal CS the selector 12 supplies a selected one of the delayed output signals of the precoders 6.1 and 6.2 via a connection 19 to the digital recorder 14 as input signal for recording. Some rate buffering is required in order that the bit modulation can be recorded at a constant bit rate by the digital recorder 14. The delays 8.1 and 8.2 can be fixed delays, with the rate buffering being provided after the selector 12; or, alternatively, the delays 8.1 and 8.2 may be first-in/first-out (FIFO) rate buffer memories that provide the necessary rate buffering.

Figure 5:
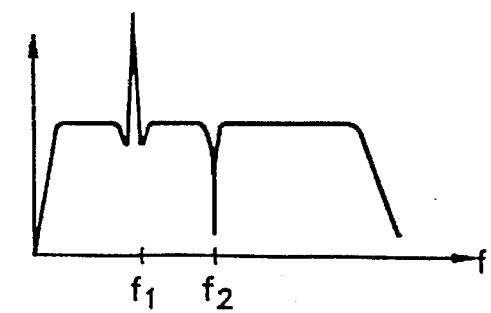
FIG. 5 illustrates one of the frequency spectra of the pattern of a serial data stream of channel words selected by a control signal generated from the control signal generator shown in FIG. 4.
Figure 4:
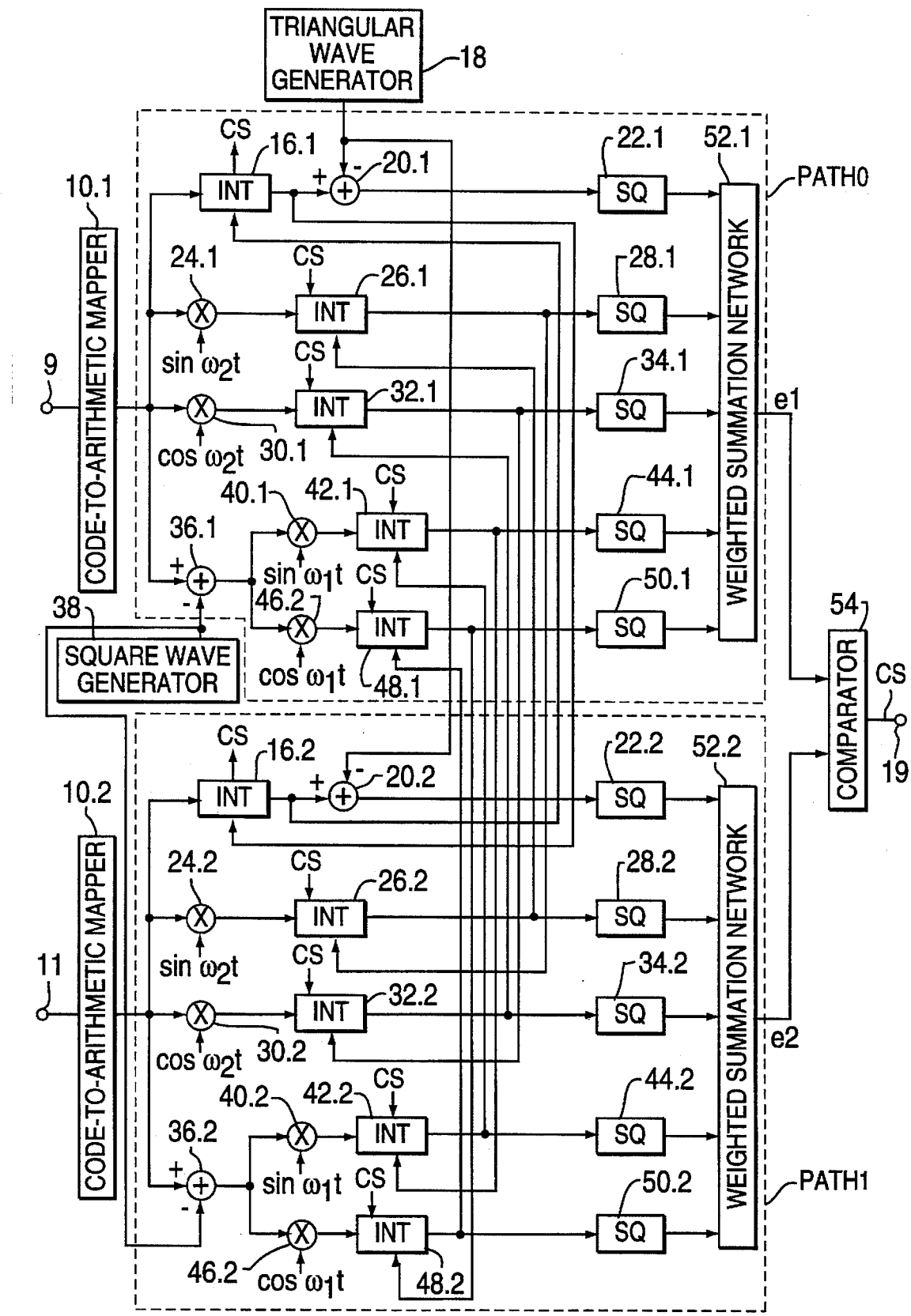
FIG. 4 is a detailed circuit diagram of a portion of an improved control signal generator for the digital signal recording apparatus shown in FIG. 3.

FIG. 4 is a detailed circuit diagram of an improved control signal generator for the FIG. 3 digital signal recording apparatus, as operated to generate a serial data stream of channel words with a frequency response spectrum as shown in FIG. 5. As compared with the spectrum of pattern F1 shown in FIG. 2B, in the spectrum shown in FIG. 5, dips occur on each side of $f_1$. These dips indicate that the noise power of the spectrum is reduced next to the pilot signal frequency $f_1$, which results in increased signal-to-noise ratio for the detection of pilot signal at frequency $f_1$.

The improved control signal generator of FIG. 4 differs from that described by Kahlman et alii in that it includes code-to-arithmetic mappers 10.1 and 10.2. The code-to-arithmetic mapper 10.1 converts the ONEs and ZEROs of the "positive"-information output of the precoder 6.1 to arithmetic descriptions of the I-NRZI modulation that switches between negative and positive arithmetic values of similar amplitude and is unaccompanied by a direct term. The code-to-arithmetic mapper 10.2 is similar in its construction to the code-to-arithmetic mapper 10.1. The code-to-arithmetic mapper 10.2 converts the ONEs and ZEROs of the "negative"-information output of the precoder 6.2 to arithmetic descriptions of the I-NRZI modulation that switches between negative and positive arithmetic values of similar amplitude and is unaccompanied by a direct term. By way of example, each of the mappers 10.1 and 10.2 can use the ONEs and ZEROs supplied thereto as a changing sign bit before an unchanging ONE, so the modulation is described in two's complement arithmetic terms.

A sine/cosine look-up table stored in read-only memory (ROM), not shown, generates a complex carrier of frequency $f_1$, having an angular frequency $\omega_1$ and composed of sin $\omega_1 t$ and cos $\omega_1 t$ components. Another sine/cosine look-up table stored in ROM, not shown, generates a complex carrier of frequency $f_2$, having an angular frequency $\omega_2$ and composed of sin $\omega_2 t$ and cos $\omega_2 t$ components. A triangular wave generator 18 generates a triangular signal corresponding to a digital sum value of an intended frequency ($f_1$) of the serial data stream of channel words, and a square wave generator 38 generates a square wave of frequency $f_1$. The triangular wave generator 18 and the square wave generator 38 can also be provided by look-up tables stored in ROM. The generation of all system functions in ROM simplifies processing the channel words in other than normal bit order.

Filter circuitry PATH0 determines how the spectral energy distribution of the I-NRZI modulation, when the generation thereof continues based on a "positive"-information channel word from the precoder 6.1, deviates from the desired spectral energy distribution for a track recorded with the F1 pattern having a peak at frequency $f_1$, a dip on either side of frequency $f_1$ and a notch at frequency $f_2$. A weighted summation circuit 52.1 combines with appropriate weighting the computed deviation from the desired notch at zero frequency and the desired peak at frequency $f_1$, as furnished from a squaring circuit 22.1, with the computed deviations from the other desired features. The computed deviations from the notch at the frequency $f_2$, as furnished for orthogonal phases of the frequency $f_2$ by squaring circuits 28.1 and 34.1, are weighted similarly to each other in the weighted summation circuit 52.1. The computed deviations from the dip on either side of frequency $f_1$, as furnished for orthogonal phases of the frequency $f_1$ by squaring circuits 44.1 and 50.1, are weighted similarly to each other in the weighted summation circuit 52.1. The effective weighting of the inputs to the weighted summation circuit 52.1 from the squaring circuits 28.1 and 34.1 is relatively large compared to the weighting of the input to the weighted summation circuit 52.1 from the squaring circuit 22.1, since lack of correct pilot frequency $f_1$ is better tolerated than presence of incorrect pilot frequency $f_2$ by the tracking correction circuitry used during playback. The effective weighting of the inputs to the weighted summation circuit 52.1 from the squaring circuits 44.1 and 50.1 is relatively small compared to the weighting of the input to the weighted summation circuit 52.1 from the squaring circuit 22.1. The filter circuitry PATH0 supplies, as the weighted sum output signal from the weighted summation circuit 52.1 therein, a first error signal e1.

The computation in the PATH0 system of the amount by which the spectral energy distribution of the I-NRZI modulation, when the generation thereof continues based on a "positive"-information channel word from the precoder 6.1, deviates from the desired notch at zero frequency and the desired peak at frequency $f_1$ peak is done in the following way. An integration circuit 16.1 receives the current "positive"-information channel word from the precoder 6.1, as converted to arithmetic form by the code-to-arithmetic mapper 10.1, and integrates it with a prestored value. A subtractor 20.1 subtracts the output signal of the triangular wave generator 18 from the output of the integration circuit 16.1; and a squaring circuit 22.1 for multiplies the resulting difference by itself; and the resulting square is supplied to the weighted summation network 52.1 to provide a component of the first error signal e1. The triangular wave generator 18 and the subtractor 20.1 provide detection circuitry for detecting any deviation from the prescribed digital sum needed for maintaining the desired pilot signal, of the digital sum value that the integration circuit 16.1 supplies. The squaring circuit 22.1 computes the energy of that deviation.

The computation in the PATH0 system of the amount by which the spectral energy distribution of the I-NRZI modulation, when the generation thereof continues based on a "positive"-information channel word from the precoder 6.1, deviates from the desired notch at frequency $f_2$ is done in the following way. A multiplier 24.1 multiplies the output of the precoder 6.1, as converted to arithmetic form by the code-to-arithmetic mapper 10.1, by a sine-wave system function sin $\omega_2 t$ of frequency $f_2$; an integration circuit 26.1 integrates the product from the multiplier 24.1; and the squaring circuit 28.1 squares the integration results from integration circuit 26.1 for application to the weighted summation network 52.1. A multiplier 30.1 multiplies the output of the precoder 6.1, as converted to arithmetic form by the code-to-arithmetic mapper 10.1, by a cosine-wave system function cos $\omega_2 t$ of frequency $f_2$; an integration circuit 32.1 integrates the product from the multiplier 30.1, and the squaring circuit 34.1 squares the integration results from integration circuit 32.1 for application to the weighted summation network 52.1. (The phrase "system function" is used in digital electronics to refer to a function in the analog regime that is described on a sampled-data basis by digital samples.)

The computation in the PATH0 system of the amount by which the spectral energy distribution of the I-NRZI modulation, when the generation thereof continues based on a "positive"-information channel word from the precoder 6.1, deviates from the desired dip on either side of a peak at frequency $f_1$ is performed in the following way. A subtractor 36.1 subtracts a square wave of frequency $f_1$ supplied by the square wave generator 38 from the output signal of the precoder 6.1, as converted to arithmetic form by the code-to-arithmetic mapper 10.1. The square wave generator 38 and the subtractor 36.1 provide detection circuitry for detecting any deviation from the prescribed square wave of the "positive"-information serial-bit channel word that the precoder 6.1, as converted to arithmetic form by the code-to-arithmetic mapper 10.1. A multiplier 40.1 multiplies the subtractor 36.1 difference output signal by a sine-wave system function sin $\omega_1 t$ of frequency $f_1$; an integration circuit 42.1 integrates the product from the multiplier 40.1; and a squaring circuit 44.1 squares the integration results from the integration circuit 42.1 for application to the weighted summation network 52.1. A multiplier 46.1 multiplies the subtractor 36.1 difference output signal by a cosine-wave system function cos $\omega_1 t$ of frequency $f_1$, an integration circuit 48.1 integrates the product from the multiplier 46.1, and a squaring circuit 50.1 squares the integration results from the integration circuit 48.1 for application to the weighted summation network 52.1.

Filter circuitry PATH1 determines the amount by which the spectral energy distribution of the I-NRZI modulation, when the generation thereof continues based on a "negative"-information channel word from the precoder 6.2, deviates from the desired spectral energy distribution for a track recorded with the F1 pattern having a peak at frequency $f_1$, a dip on either side of frequency $f_1$ and a notch at frequency $f_2$. A weighted summation circuit 52.2 in the filter circuitry PATH1 combines with appropriate weighting the computed deviation from the desired notch at zero frequency and the desired peak at frequency $f_1$, as furnished from a squaring circuit 22.2, with the computed deviations from the other desired features as supplied from squaring circuits 28.2, 34.2, 44.2 and 50.2. The weighted summation network 52.2 supplies, as the sum output signal therefrom, a second error signal e2. A comparator 54 compares the error signals e1 and e2 for generating the control signal CS, supplied to the selection control port of the selector 12 which selects the channel word having an error signal of a smaller value.

The computation in the PATH1 system of the amount by which the spectral energy distribution of the I-NRZI modulation, when the generation thereof continues based on a "negative"-information channel word from the precoder 6.2, deviates from the desired notch at zero frequency and the desired peak at frequency $f_1$ peak is done in the following way. An integration circuit 16.2 receives the current "negative"-information channel word from the precoder 6.2, as converted to arithmetic form by the code-to-arithmetic mapper 10.2, and integrates it with a prestored value. A subtractor 20.2 subtracts the output signal of the triangular wave generator 18 from the output of the integration circuit 16.2; and a squaring circuit 22.2 for multiplies the resulting difference by itself; and the resulting square is supplied to the weighted summation network 52.2 to provide a component of the second error signal e2. The triangular wave generator 18 and the subtractor 20.2 provide detection circuitry for detecting any deviation from the prescribed digital sum needed for maintaining the desired pilot signal, of the digital sum value that the integration circuit 16.2 supplies. The squaring circuit 22.2 computes the energy of that deviation.

The computation in the PATH1 system of the amount by which the spectral energy distribution of the I-NRZI modulation, when the generation thereof continues based on a "negative"-information channel word from the precoder 6.2, deviates from the desired notch at frequency $f_2$ is done in the following way. A multiplier 24.2 multiplies the output of the precoder 6.2, as converted to arithmetic form by the code-to-arithmetic mapper 10.2, by a sine-wave system function $\sin \omega_2 t$ of frequency $f_2$; an integration circuit 26.2 integrates the product from the multiplier 24.1; and the squaring circuit 28.2 squares the integration results from integration circuit 26.2 for application to the weighted summation network 52.2. A multiplier 30.2 multiplies the output of the precoder 6.2, as converted to arithmetic form by the code-to-arithmetic mapper 10.2, by a cosine-wave system function $\cos \omega_2 t$ of frequency $f_2$; an integration circuit 32.2 integrates the product from the multiplier 30.2, and the squaring circuit 34.2 squares the integration results from integration circuit 32.2 for application to the weighted summation network 52.1.

The computation in the PATH1 system of the amount by which the spectral energy distribution of the I-NRZI modulation, when the generation thereof continues based on a "negative"-information channel word from the precoder 6.2, deviates from the desired dip on either side of a peak at frequency $f_1$ is performed in the following way. A subtractor 36.2 subtracts a square wave of frequency $f_1$ supplied by the square wave generator 38 from the output signal of the precoder 6.2, as converted to arithmetic form by the code-to-arithmetic mapper 10.2. The square wave generator 38 and the subtractor 36.2 provide detection circuitry for detecting any deviation from the prescribed square wave of the "negative"-information serial-bit channel word that the precoder 6.2 supplies via the connection 11. A multiplier 40.2 multiplies the subtractor 36.2 difference output signal by a sine-wave system function $\sin \omega_1 t$ of frequency $f_1$; an integration circuit 42.2 integrates the product from the multiplier 40.2; and a squaring circuit 44.2 squares the integration results from the integration circuit 42.2 for application to the weighted summation network 52.2. A multiplier 46.2 multiplies the subtractor 36.2 difference output signal by a cosine-wave system function $\cos \omega_1 t$ of frequency $f_1$, an integration circuit 48.2 integrates the product from the multiplier 46.2, and a squaring circuit 50.2 squares the integration results from the integration circuit 48.2 for application to the weighted summation network 52.2.

The operation of the control signal generator 10 when generating the F1 pattern has been described. When generating the F2 pattern, the operation of the control signal generator 10 is modified by transposing $f_1$ and $f_2$, thereby also transposing $\omega_1$ and $\omega_2$. When generating the F0 pattern, the operation of the control signal generator 10 is modified, disabling the triangular wave generator 18 and disabling the square wave generator 38. Irrespective of whether the F0, F1 or F2 pattern is being generated, certain re-initialization procedures have to be followed subsequent to the decision being made as to whether to select a "positive"-information channel word provided by the precoder 6.1 or to select a "negative"-information channel word provided by the precoder 6.2 to determine the I-NRZI modulation to be recorded. These re-initialization procedures provide for continuity of coding and for enabling the control signal generator to establish a basis from which a decision can be made concerning which of the next pair of channel words is to be selected for recording.

In the latter regard, when the channel word that is to be recorded next has been determined, the contents of the integration circuits 16.1, 26.1, 32.1, 42.1 and 48.1 or the contents of the integration circuits 16.2, 26.2, 32.2, 42.2 and 48.2 have to be changed. If the newly selected channel word is of "negative"-information type, the contents of the integration circuits 16.1, 26.1, 32.1, 42.1 and 48.1 are changed to correspond to the contents of the integration circuits 16.2, 26.2, 32.2, 42.2 and 48.2, respectively. If the newly selected channel word is of "positive"-information type the contents of the integration circuits 16.2, 26.2, 32.2, 42.2 and 48.2 are changed to correspond to the contents of the integration circuits 16.1, 26.1, 32.1, 42.1 and 48.1, respectively.

As noted previously, when the channel word that is to be recorded next has been determined, precoding information from the "integrating feedback connection" of the one of the precoders 6.1 and 6.2 supplying the channel word which is selected for recording must be transferred into the "integrating feedback connection" of the other of the precoders 6.1 and 6.2. If the channel word selected for being recorded next was supplied from the precoder 6.1, the contents of the shift register in the integrating feedback connection of its exclusive-OR gate are transferred to corresponding positions in the shift register in the integrating feedback connection of the exclusive-OR gate in the precoder 6.2. On the other hand, if the channel word selected for being recorded next was supplied from the precoder 6.2, the contents of the shift register in the integrating feedback connection of its exclusive-OR gate are transferred to corresponding positions in the shift register in the integrating feedback connection of the exclusive-OR gate in the precoder 6.1.

In practice, however, there is substantial time delay before this transfer can be completed in the prior-art digital signal recording apparatus described in U.S. Pat. No. 5,142,421, which delay arises in the digital multipliers, integration circuits, and squaring circuits in the control signal generator 10. This delay necessitates intermittently written buffer storage after the encoder 6, as can be provided by the time compensator 8, and necessitates intermittently read buffer storage before the encoder 6, as can be provided by the parallel-to-serial converter 2. The arrangements for this intermittent reading and writing of buffer storage are, in practice, difficult to arrange clocking for. As pointed out by the inventor, Soon-Tae Kim, in his concurrently filed application entitled DIGITAL SIGNAL RECORDING APPARATUS the need intermittent reading and writing of buffer storage can be avoided by performing precoding on a parallel-bit word basis. A 2T precoder for parallel-bit words is considerably more complex in its structure than a 2T precoder for serial-bit words, however.

Figure 6:
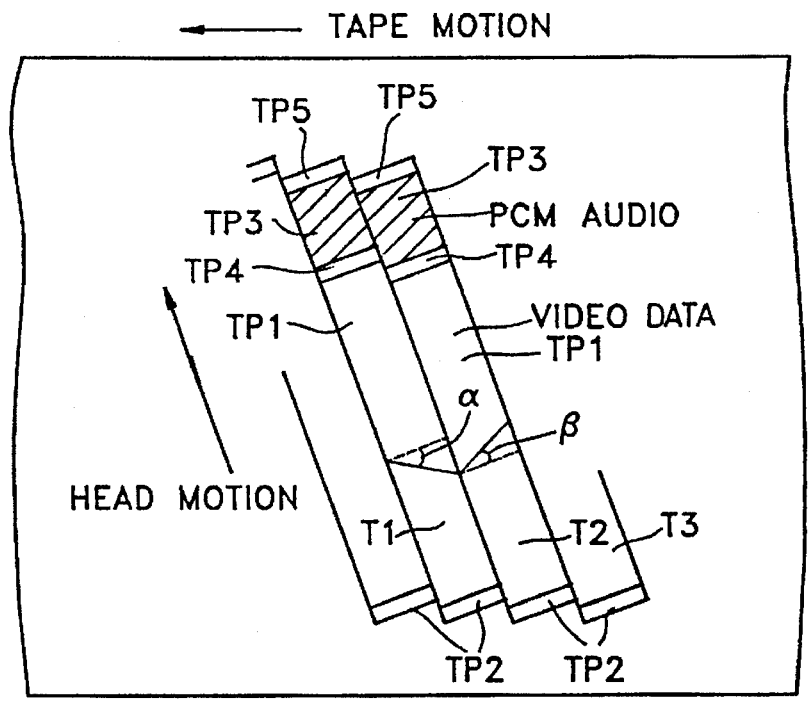
FIG. 6 is a diagram of a previously known track pattern utilized in the present invention.

FIG. 6 depicts a magnetic recording medium on which a digital video signal and a digital audio signal are recorded in tracks T1, T2, ... disposed at a predetermined angle to the longitudinal axis on the magnetic recording medium. Digital video information is stored in a respective first track part TP1 of each of the tracks. Each track begins with a respective second track part TP2, which contains preamble information. Digital audio information, for instance, a pulse-coded-modulation audio signal, is stored in a respective third track part TP3 of each track. The first and third track parts TP1 and TP3 of each track are separated by a respective fourth track part TP4. Each track finishes with a respective fifth track part TP5, which contains postamble information.

Figure 7:
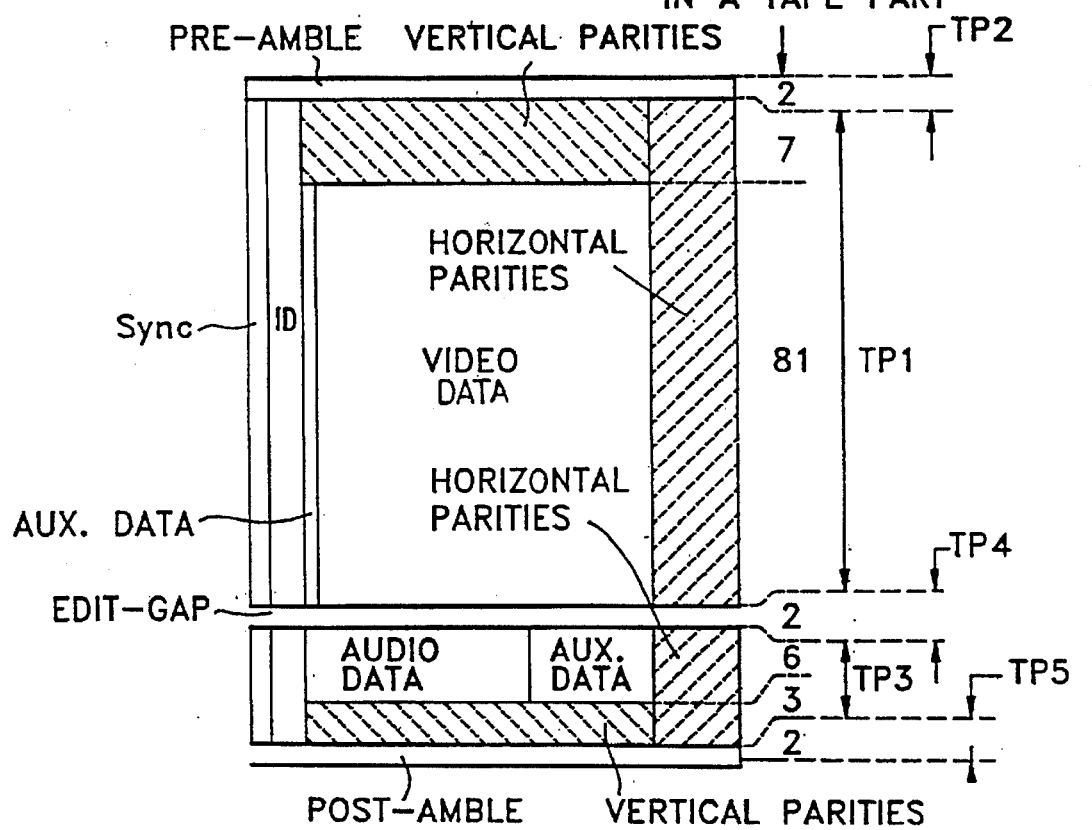
FIG. 7 illustrates the contents of information recorded on a single track shown in FIG. 6.

FIG. 7 schematically shows the information of the serial data stream of channel words recorded on a single track. In FIG. 7, for instance, two lines of 25-bit channel words are recorded on each second track part TP2. The respective lines each have forty-seven 25-bit channel words. The total information recorded on each second track part TP2 consists of ninety-four 25-bit channel words.

After the second track part TP2, the information recorded on the first track part TP1 is 88 lines of information. The respective lines each have forty-seven 25-bit channel words. The track part TP1 contains sync data, identification (ID) data, auxiliary data, video data, horizontal parity data and vertical parity data.

The fourth track part TP4 follows the first track part TP1. As in the case of the second track part TP2, forty-seven 25-bit channel words are recorded in each of two lines on the fourth track part TP4.

Nine lines of information are present on a third track part TP3 following the fourth track part TP4. The respective lines each contain forty-seven 25-bit channel words. The third track part TP3 contains sync data, ID data, auxiliary data, audio data, horizontal parity data and vertical parity data.

On the fifth track part TP5, 1325 bits (fifty-three 25-bit channel words) are recorded in the case of a 625-line system, and 1445 bits in the case of a 525-line system.

The detailed description of the structure and information on the signal recorded on the magnetic recording medium shown in FIGS. 6 and 7 is disclosed in European patent application No. 0 492 704 A1 published 1 Jul. 1992, entitled "Arragement for recording clock run-in codewords at the beginning of a track on a magnetic record carrier" and incorporated herein by reference. In the reference, a pilot signal is loaded on the second track part TP2 by a predetermined number of channel words. The fourth track part TP4, as an edit gap, contains the same channel words as those of the second track part TP2, as does the fifth track part TP5.

In the present invention, however, the serial data stream is such that it includes a pilot signal of frequency $f_1$ that continues throughout the track parts TP2, TP1, TP4, TP3 and TP5 of every track in a first set of tracks and a pilot signal of frequency $f_2$ that continues throughout the track parts TP2, TP1, TP4, TP3 and TP5 of every track in a second set of tracks. Run-up data are loaded on the fourth track part TP4 of each track, rather than repeating the channel words of the first track part TP1. The loaded run-up data is designed to prevent the false operation of a phase-locked loop circuit operating at a bit clock frequency and is necessary for the bit extraction of a reproduced signal during playback. A preferred embodiment of the present invention will be described below.

Referring to FIG. 8, an input port 101 for receiving serially supplied 8-parallel-bit words connects to the input port of a parallel-to-parallel (P/P) converter 102. The P/P converter 102 converts each consecutive group of three serial 8-parallel-bit words supplied to its input port into three parallel 8-parallel-bit digital words, i.e., a 24-bit information word, and supplies the converted word in parallel-bit form from its output port 103. A signal inserter 104 affixes a single-bit digital word prefix, a "0" bit to each 24-bit information word supplied in parallel-bit form from the output port 103 of the P/P converter 102.

FIG. 7 shows how sync data are recorded in a predetermined format and loaded at the beginning of respective lines of the first and third track parts TP1 and TP3. The seventeen bits of the sync data form a 25-bit information word together with an initial 8-bit information word supplied in parallel from the P/P converter 102. The initial 8-bit information word corresponds to ID data and is described in detail in European patent application No. 0 492 704 A1.

When a signal is recorded on the fourth track part TP4, the signal inserter 104 receives external run-up data in which the 25-bit information words have a predetermined format. A generator (not shown) is provided to generate sync data and run-up data and to generate a "0" bit for the signal inserter 104 if that bit is introduced serially into the 25-bit information, rather than being introduced as a wired ZERO into the 25-parallel-bit information.

Through these procedures, the obtained 25-bit information word is supplied via output port 105 for application as input signal to a precoder 106. The precoder 106 converts the 25-parallel-bit information word into a 25-parallel-bit channel word. It is preferable that the signal inserter 104 affix only a single-bit prefix onto each information word and that a 2T precoder is used for the precoder 106.

If the signal inserter 104 affixes a "0" bit prefix onto each information word, the precoder 106 generates a "positive"-information channel word in which the odd occurring bits starting with the prefix bit are bit complements of the corresponding bits in the "negative"-information channel word that would normally be generated by another precoder processing information words to which "1" bit prefixes have been affixed, but in which the intervening even occurring bits are the same as the corresponding bits in the "negative"-information channel word. Accordingly, when in accordance with the present invention only one 2T precoder is used for generating I-NRZI modulation, in embodiments in which that 2T precoder generates a "positive"-information channel word, the "negative"-information channel word can be produced from the "positive"-information channel word by bit-complementing its odd bit-places and retaining its even bit-places without change. In alternative embodiments of the invention, in which a lone 2T precoder generates a "negative"-information channel word, the "positive"-information channel word can be produced from the "negative"-information channel word by bit-complementing its odd bit-places and retaining its even bit-places without change.

First and second P/S converters 108 and 110 have respective input ports to each of which the output port 107 of the precoder 106 couples and have respective output ports coupled to input ports of a selector 122 via delays 116 and 118, respectively. The delays 116 and 118 provide compensation for the time necessary for a control signal generator 120 to supply a control signal to the selector 122 in response to the precoder 106 output signal as converted to serial-bit format. More specifically, the first P/S converter 108 converts to bit-serial form the "positive"-information 25-parallel-bit channel word supplied from the precoder 106. The second P/S converter 110 selectively inverts only the odd bit-places of the "positive"-information 25-parallel-bit channel word (hereinafter referred to as an "odd channel" word) and converts to bit-serial format the resulting "negative"-information channel word.

A third P/S converter 112 selects a respective odd channel word from each 25-parallel-bit channel word supplied by the precoder 106 and converts the selected odd channel word into a 13-serial-bit odd channel word supplied from its output port 115 to a code-to-arithmetic mapper 1150. The code-to-arithmetic mapper 1150 converts the ONEs and ZEROs of the odd channel word to arithmetic descriptions of NRZI modulation that switches between negative and positive arithmetic values of similar amplitude and is unaccompanied by a direct term. The code-to-arithmetic mapper 1150 supplies these descriptions from its output port 115' to the control signal generator 120. A fourth P/S converter 114 selects the even bit-places of each 25-parallel-bit channel word supplied by the precoder 106 (hereinafter referred to as an "even channel" word) and converts the selected even channel word into a serial 12-serial-bit even channel word supplied from its output port 117 to a code-to-arithmetic mapper 1170. The code-to-arithmetic mapper 1170 converts the ONEs and ZEROs of the even channel word to arithmetic descriptions of NRZI modulation that switches between negative and positive arithmetic values of similar amplitude and is unaccompanied by a direct term. The code-to-arithmetic mapper 1170 supplies these descriptions from its output port 117' to the control signal generator 120. The third and fourth P/S converters 112 and 114 together can be designated as a time-share multiplexer.

The control signal generator 120 generates first and second control signals, based upon the odd and even channel word signals received from the third P/S converter 112 and from the fourth P/S converter 114. The first control signal CS1 is supplied from an output port 123 of the control signal generator 120 to the control port of the precoder 106 for controlling its re-initialization at the end of each channel word interval. The second control signal CS2 maintains one of two values throughout a channel word interval and is supplied from an output port 125 of the control signal generator 120 output to the selection control port of the selector 122.

The selector 122 receives the 25-serial-bit "positive"-information channel word supplied from the first P/S converter 108 and the 25-serial-bit "negative"-information channel word output from the second P/S converter 110. Then, the selector 122 selects to recording portion 124 the one of these channel words that the second control signal CS2 indicates will cause the least deviation from the spectral response desired for the track being recorded.

Figure 9A:
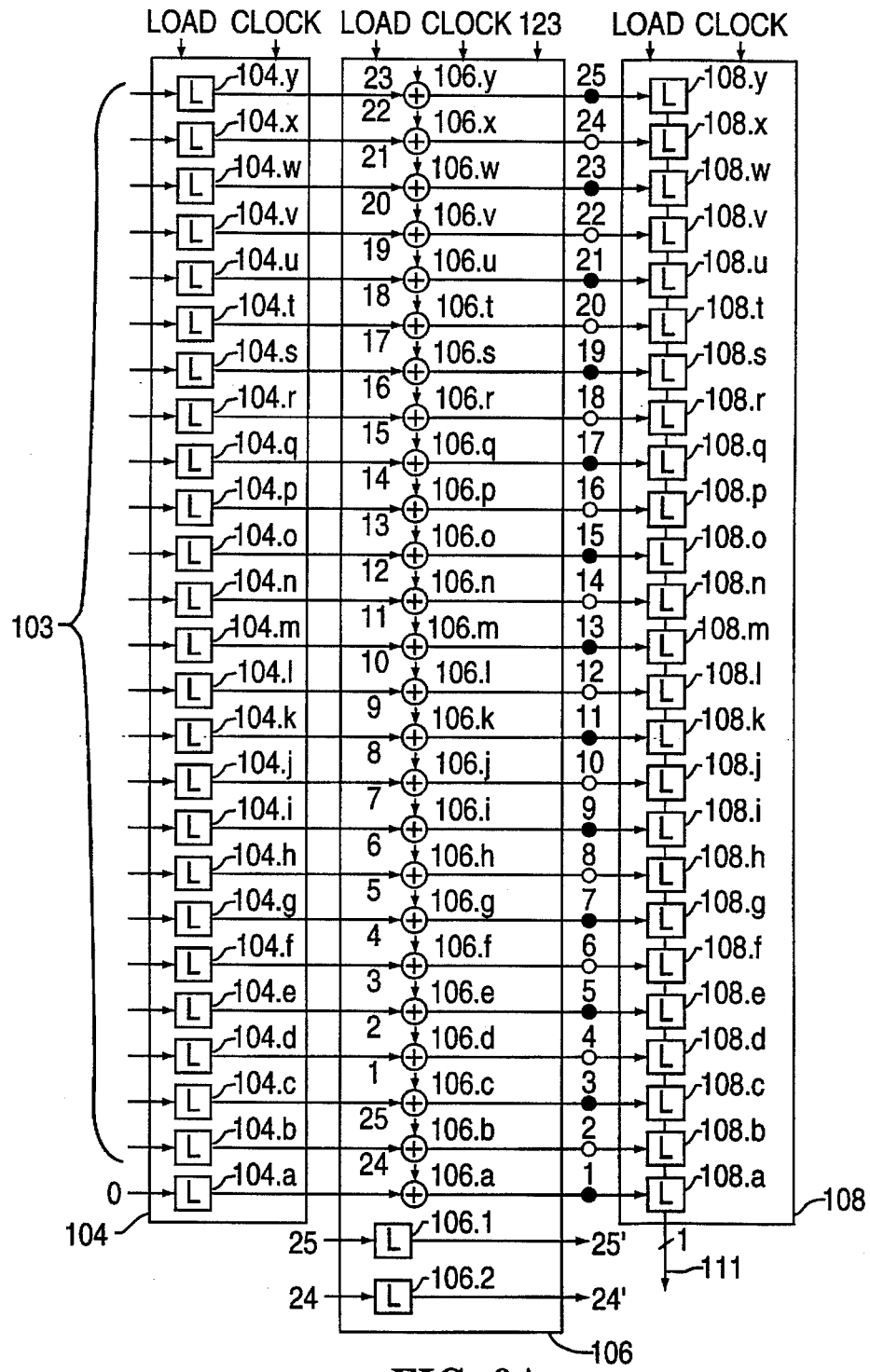
FIG. 9A is a detailed block diagram of a signal inserter, a precoder and a parallel-to-serial converter used in the FIG. 8 digital signal recording apparatus.

FIG. 9A is a detailed block diagram of the signal inserter 104, the precoder 106 and the P/S converter 108, all of which are shown in FIG. 8. FIGS. 9B, 9C and 9D are respective detailed block diagrams of the P/S converters 110, 112 and 114, each of which is shown in FIG. 8. The operation of the circuits shown in FIGS. 9A, 9B, 9C and 9D will be explained with reference to FIGS. 10A–10I, 11, 12A, 12B, 13, 14 and 15A–15I.

Referring to FIG. 9A, the signal inserter 104 is made up of twenty-five latches 104.a–104.y. Responsive to a system CLOCK signal and a LOAD signal simultaneosly occurring, a "0" bit is inserted into the latch 104.a used for storing the MSB, and the other twenty-four latches 104.b–104.y receive the 24-parallel-bit information word supplied from the output port 103 of the P/P converter 102. When sync data are inserted, as shown in FIGS. 10A–10D, seventeen bits of sync data having a predetermined format are input to the latches 104.a–104.q. Eight bits of ID data output from the output port 103 of the P/P converter 102 are input to the remaining eight latches 104.r–104.y. In the case where run-up data are inserted, as shown in FIG. 10G, twenty-five bits of run-up data having a predetermined format are input to the latches 104.a–104.y.

As shown in a detailed circuit diagram of the signal inserter 104 within FIG. 11, each of the twenty-five latches 104.a–104.y is respectively made up of one D flip-flop, two AND gates and one OR gate. In the operation of the respective latches, when the LOAD signal is a logic high, a "0" bit input to the data port of latch 104.a and the 24-bit information word output from the P/P converter 102 are latched and the latched outputs are supplied via the Q port of the respective D flip-flops. When the LOAD signal is a logic low, the latches maintain the Q output of the respective D flip-flops unchanged.

The first inputs of XOR gates 106.a–106.y of the precoder 106 shown in FIG. 9A are coupled to the outputs of respective ones of the latches 104.a–104.y of the signal inserter 104. The second inputs of the XOR gates 106.a and 106.b connect from the respective outputs of the latches 106.2 and 106.1. The second inputs of the XOR gates 106.c–106.y are connected to the respective outputs of the XOR gates 106.a–106.w. The outputs of the XOR gates 106.x and 106.y are coupled to the respective inputs of the latches 106.2 and 106.1.

The operation of the precoder 106 is explained, following. The second LSB from the preceding channel word and the MSB (here, the inserted "0" bit) of the present 25-bit channel word are input to the XOR gate 106.a. The LSB from the preceding channel word and the second MSB (here, the first bit of input data) of the present 25-bit channel word are input to the XOR gate 106.b. The output of the XOR gate 106.a and the second bit of the input data are input to the XOR gate 106.c. The output of the XOR gate 106.b and the third bit of the input data are input to the XOR gate 106.d.

The XOR gates 106.e–106.y collectively 2T-precode the 25-bit information word. The outputs of the XOR gates 106.a–106.y are the 25-bit channel word supplied in parallel from the precoder 106.

Figure 10A:
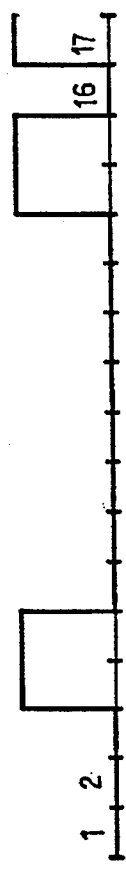
Figure 10B:
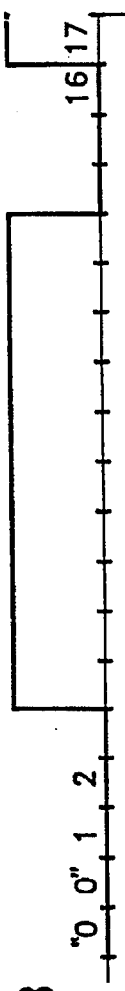
Figure 10C:
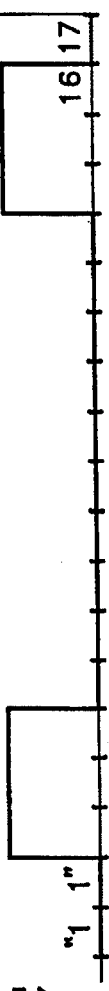
Figure 10D:
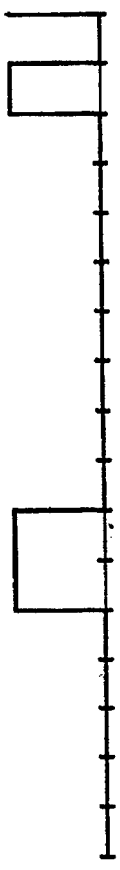
Figure 10E:
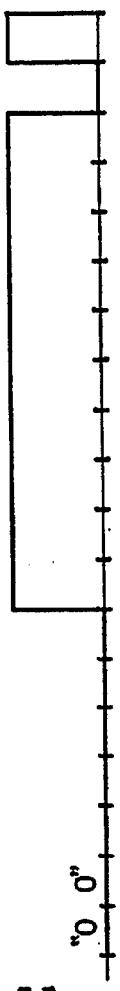
Figure 10F:
Figure 10G:
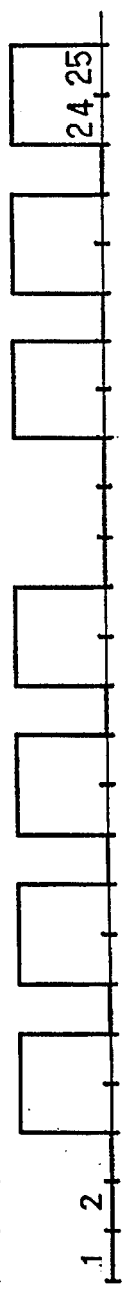

In the present invention using one precoder, in the case where the data supplied to the precoder 106 are sync data shown in FIGS. 10A or 10D, the initial value of the latches 106.1 and 106.2 is set as "00" in performing the pre-coding. In doing so, a signal is generated as shown in FIG. 10B or 10E. As shown in FIG. 10C or 10F, the result of the precoding performed when the initial value of the latches 106.1 and 106.2 is "11" is the sync data in which the channel word precoded when the initial value is "00" is inverted. The result is generated using the second P/S converter 110, altered in its operation when converting sync or run-up data so that it bit-complements all the bits in the channel words supplied to it from the precoder 106, rather than just the odd channel word components.

Figure 10H:
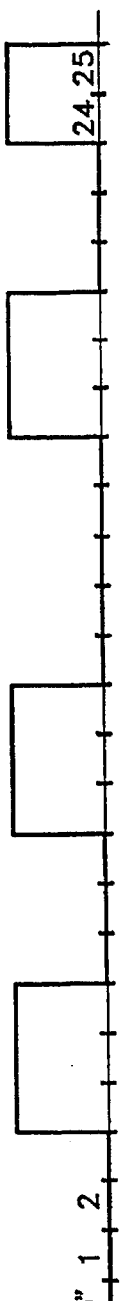

In the case where the data input to the precoder 106 is run-up data as shown in FIG. 10G, the signal shown in FIG. 10H is supplied from the precoder 106 when the initial value of the latches 106.1 and 106.2 is "00."

Figure 10I:
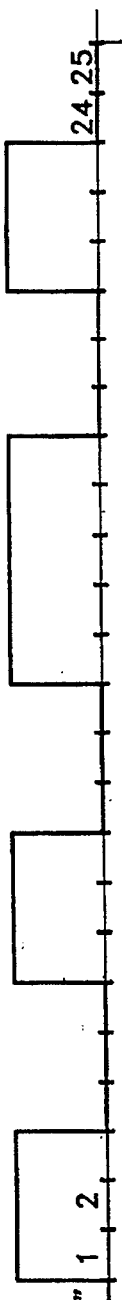

As shown in FIG. 10I, the precoded run-up data when the initial value "11" is the inverted result of the pre-coded run-up data when the initial value is "00." The result is generated using the second P/S converter 110, altered in its operation when converting sync or run-up data so that it bit-complements all the bits in the channel words supplied to it from the precoder 106, rather than just the odd channel word components.

The connection of the latches 106.1 and 106.2 of the precoder 106 shown in detailed circuit diagram FIG. 12B is an alternative to the connection of the latches 106.3 and 106.4 of the precoder 106 shown in detailed circuit diagram FIG. 12A.

Referring to FIG. 12A, when LOAD signal is a logic high, output signal 24 of the XOR gate 106.x supplied to the data port of D flip-flop D2 via gates G8 and G9 is supplied as the second LSB 24' of the preceding channel word, to the second input port of the XOR gate 106.a of FIG. 9A responsive to the CLOCK signal. Simultaneously, output signal 25 of the XOR gate 106.y supplied to the data port of D flip-flop D1 via gates G2, G3, G5 and G6 is supplied as the LSB 25' of the preceding channel word, to the second input port of the XOR gate 106.b of FIG. 9A according to the CLOCK signal. When the LOAD signal is a logic low, D flip-flops D1 and D2 maintain the output of output port Q until the LOAD signal goes high.

Since the output of D flip-flop D1 is subject to the influence of the first control signal CS1 supplied from the first control signal output port 123 of the control signal generator 120 shown in FIG. 8, if the first control signal CS1 is high, the output 25 of the XOR gate 106.y is supplied without change. If the first control signal CS1 is low, the output of the XOR gate 106.y is supplied after inversion.

For instance, when the output 25 of the XOR gate 106.y is a logic high and the first control signal CS1 is a logic low, the output of D flip-flop D1 is high. If the output 25 of the XOR gate 106.y and the first control signal CS1 are both high, the output old flip-flop D1 is a logic high.

If the first control signal CS1 is high, which indicates that the "positive"-information channel word is selected, the initial value of the latch 106.1 of the precoder 106 stays unchanged. If the control signal CS1 is low, which indicates that the "negative"-information channel word is selected, the initial value of the latch 106.1 of the precoder 106 is bit-complemented.

Instead of using the AND gates G1 and G2 for receiving first control signal CS1 and the LSB of the preceding channel word, the same operation can be performed using the OR gate G3, inverter G10 and XOR gate G11, as shown in FIG. 12B.

The first P/S converter 108 of FIG. 9A receives the respective outputs of the XOR gates 106.a–106.y in parallel, responsive to the simultaneous occurrence of the (system) CLOCK signal and LOAD signal, and subsequently supplies the received outputs as a 25-serial-bit channel word. The P/S converter 108 is composed of twenty-five latches 108.a–108.y and is shown in FIG. 13 in detail. Each of the latches is made up of two AND gates, an OR gate and a D flip-flop.

When the LOAD signal is a logic high, the D flip-flops each receive the output of a corresponding XOR gate of the precoder 106 and apply the received output as the input of the first AND gate of the latch of the next upper bit. If the LOAD signal is a logic low, the respective D flip-flops hold the Q outputs until the LOAD signal goes high. As the final output, a 25-serial-bit channel word is supplied from the Q port of the D flip-flop of the latch 108.a for latching the MSB channel word.

FIG. 9B is a detailed block diagram of the second P/S converter 110 in the FIG. 8 digital signal recording apparatus.

The detailed circuit diagram of the second P/S converter 110 is shown in FIG. 14.

Referring to FIG. 14, in order to generate the "negative"-information 25-bit information word so it is available to be selected for inclusion in the I-NRZI code, the odd channel words of the "positive"-information 25-bit channel word are bit-complemented. Among the odd latches, for instance, a latch 110.a comprises a first AND gate G12 having a non-inverting input coupled to the output of the D flip-flop D4 of the preceding latch (here, 110.b) and an inverting input receiving the LOAD signal, a second AND gate G13 having a non-inverting input receiving the LOAD signal and an inverting input coupled to the output of an XOR gate (106.a of FIG. 9) of the precoder 106, an OR gate G14 for logically summing the outputs of the first and second AND gates G12 and G13, and a D flip-flop D3 the data input port of which is coupled to the output of the OR gate G14, the clock port of which receives the system CLOCK signal, and the Q output port of which supplies a serial-bit channel word.

In order to obtain sync data and run-up data I-NRZI-modulated with the initial value of "11" having the inversion result of the result I-NRZI-modulated with the initial value of "00," the second P/S converter 110 is constructed to bit-complement the even channel words as well.

Among the latches for even-occurring bits, the latch 110.b for the second MSB bit comprises a first AND gate G15 having an inverting input receiving a sync/run-up control signal and a non-inverting input receiving the corresponding output of the XOR gate (106.b of FIG. 9), a second AND gate G16 having a non-inverting input receiving the sync/run-up control signal and an inverting input receiving the output of the precoder, a first OR gate G17 for logically summing the outputs of the first and second AND gates G15 and G16, a third AND gate G18 having a non-inverting input connected to the Q output port of D flip-flop D5 of the preceding latch (here, 110.c) and an inverting input receiving the LOAD signal, a fourth AND gate G19 for receiving the LOAD signal and the output of the first OR gate G17, a second OR gate G20 for logically summing the outputs of the third and fourth AND gates G18 and G19, and a D flip-flop D3 the data input port of which connects to the output of the second OR gate G20, the clock port of which receives the CLOCK signal, and the Q output port of which is coupled to the non-inverting input of the first AND gate G12 of the upper-bit latch (here, 110.a). (For the even-occurring-bit latches, the latches ((for instance, 110.b)) can be composed of one XOR gate instead of two AND gates G15 and G16 and an OR gate G17.) For convenience, the reference numerals of the two AND gates, OR gate, and D flip-flop included as components within each latch are numbered for the latches 110.a, 110.b and 110.c.

The run-up control signal is applied to all even-occurring-bit latches among the twenty-five latches. Since each block of sync data consists of seventeen bits, the sync control signal is applied to the latches corresponding to the even ones of the seventeen leading bit-places.

Except when handling sync or run-up data, the second P/S converter 110 bit-complements only the odd channel word component of its 25-parallel-bit "positive"-information channel word input, and converts the resulting 25-parallel-bit "negative"-information channel word into a 25-serial-bit "negative"-information channel word. If the data supplied to the second P/S converter 110 are sync data, in the 25-parallel-bit channel word supplied from the precoder 106, the 2nd, 4th, 6th, 8th, 10th, 12th, 14th, and 16th bits of even channel words as well as all the bits of the odd channel words are bit-complemented in the 25-serial-bit channel word supplied from the second P/S converter 110. If the data supplied to the second P/S converter 110 are run-up data, all bits of the 25-parallel-bit channel word supplied from the precoder 106 are bit-complemented in the 25-serial-bit channel word supplied from the second P/S converter 110.

The third P/S converter 112 shown in the FIG. 9C detailed block diagram comprises thirteen latches. This configuration is the same as that of the respective latches of the first P/S converter 108 shown in FIG. 13. In response to the LOAD signal, the third P/S converter 112 loads as its input signal only the odd channel words from the 25-parallel-bit channel word supplied from the precoder 106; and thereafter, in response to the system CLOCK signal, supplies a 13-serial-bit channel word to the output port 115 of the latch 112.*a*.

The fourth P/S converter 114 shown in the FIG. 9D detailed block diagram comprises twelve latches. This configuration is the same as that of the respective latches of the first P/S converter 108 shown in FIG. 13. In response to the LOAD signal, the fourth P/S converter 114 loads as its input signal only the even channel words from the 25-parallel-bit channel word supplied from the precoder 106; and thereafter, in response to the system CLOCK signal, supplies a 12-serial-bit channel word to the output port 117 of latch 114.*a*.

Figure 15:
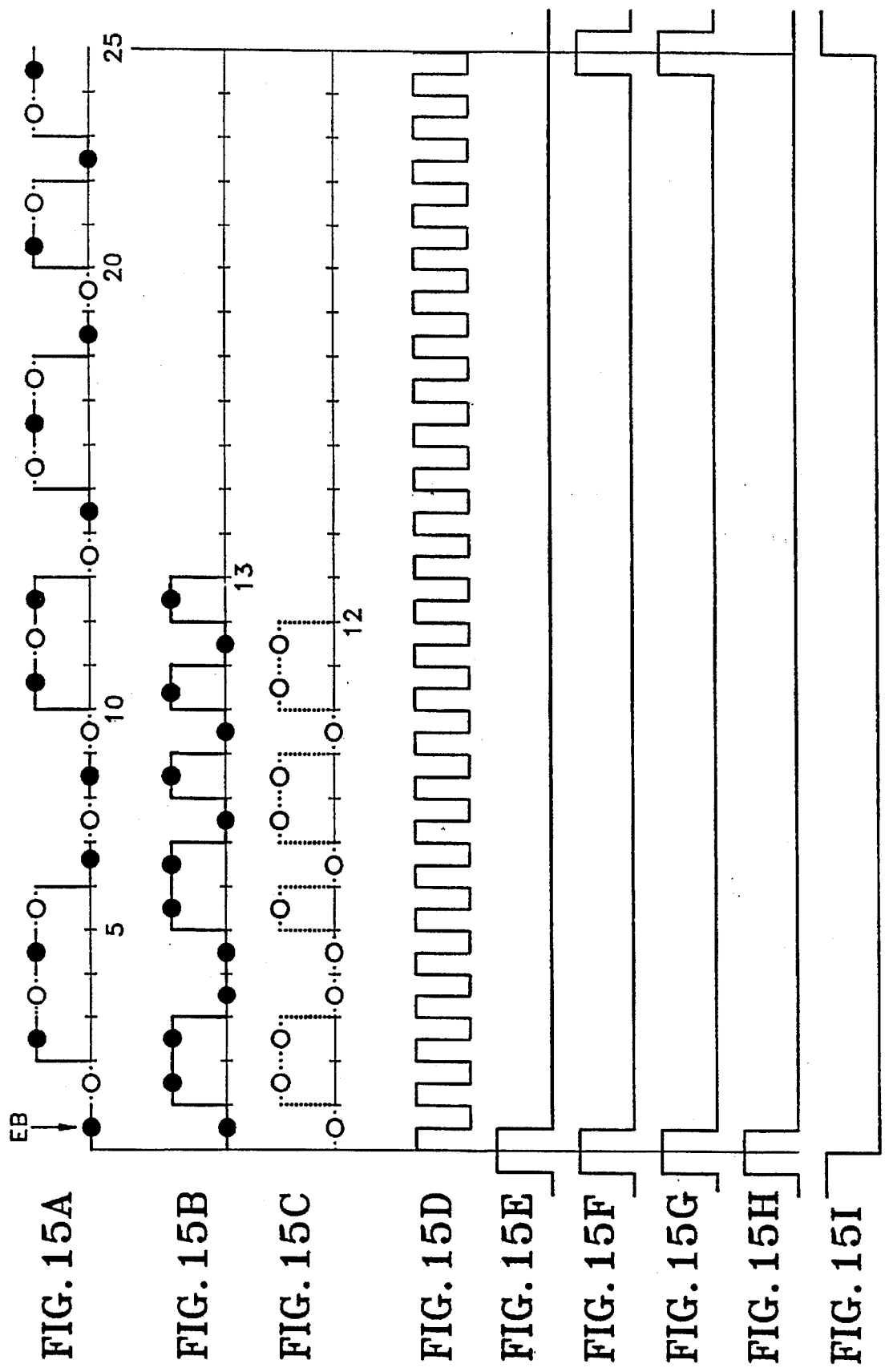

FIGS. 15A–15I are operation waveforms of blocks shown in FIGS. 8, 9A, 9B, 9C and 9D. FIG. 15A illustrates the 25-serial-bit channel word supplied from the precoder 106. FIG. 15B illustrates the 13-serial-bit channel word supplied from the third P/S converter 112. FIG. 15C illustrates the 12-serial-bit channel word supplied from the fourth P/S converter 114. FIG. 15D illustrates the system CLOCK signal input to the respective blocks of FIGS. 9A, 9B, 9C and 9D, by bits. FIG. 15E illustrates the first control signal CS1 generated from control signal generator 120 and input to the latch 106.1 of the precoder 106 of FIG. 9A. FIG. 15F illustrates the LOAD signal input to the respective blocks of FIGS. 9A, 9B, 9C and 9D, with a period of one 25-bit channel word. FIG. 15G illustrates a run-up control signal generated over a period of twenty-five bits and supplied to the second P/S converter 110. FIG. 15H illustrates a sync control signal generated over a period of one line and supplied to the second converter 110. FIG. 15I illustrates the second control signal CS2 generated by the control signal generator 120 of FIG. 8 and supplied to the selector 122.

If the second control signal CS2 is high, the selector 122 reproduces as its output signal the serial-bit output signal from the first P/S converter 108. If the second control signal CS2 is low, the selector 122 reproduces as its output signal the serial-bit output signal from the second P/S converter 110. The second control signal CS2 is generated without change over each consecutive period of one 25-bit channel word.

When the 25-bit channel word is time-share-multiplexed into the odd and even channel words shown in FIGS. 15B and 15C, at least for the period of the 12-bit channel word from the period of the 25-bit channel word of the precoder 106, time delayed by the integrators, multipliers and squaring circuits of control signal generator 120 shown in FIG. 16 is compensated for, thereby enabling the generation of a control signal for selecting one of an intended frequency characteristics between the outputs of the first and second P/S converters 108 and 110. This allows the control signal to be generated in real time.

FIG. 16 is a detailed circuit diagram of the control signal generator 120 of FIG. 8, as specifically operated during the recording of a first set of tracks recorded with the pattern F1. In FIG. 16, the bits of each odd channel word serially supplied from the output port 115 of the third P/S converter 112 are applied as sign bits before respective ONEs to generate TWOs complement numbers applied to an adder 126 as its first summand input signal, applied to the subtractor 128 as its subtrahend input signal, applied to subtractors 182 and 204 as their minuend input signals, and applied to multipliers 146 and 162 as their multiplicand input signals. The bits of each even channel word serially supplied from the output port 117 of the fourth P/S converter 114 are applied as sign bits before respective ONEs to generate TWOs complement numbers applied to the adder 126 as its second summand input signal, applied to the subtractor 128 and to subtractors 176 and 200 as their minuend input signals, and applied to multipliers 144 and 160 as their multiplicand input signals. After the last bit of each even channel word serially supplied from the output port 117 of the fourth P/S converter 114 is clocked to the adder 126 as its second summand input signal, to the subtractors 128 and 176 and 200 as their minuend input signals, and to multipliers 144 and 160 as their multiplicand input signals, arithmetic zeroes are subsequently clocked for the remainder of the channel word interval to the adder 126 as its second summand input signal, to the subtractors 128 and 176 and 200 as their minuend input signals, and to the multipliers 146 and 162 as their multiplicand input signals. After the last bit of each odd channel word serially supplied from the output port 115 of the fourth P/S converter 112 is clocked to the adder 126 as its first summand input signal, to the subtractor 128 as its subtrahend input signal, to subtractors 182 and 204 as their minuend input signals, and to multipliers 146 and 162 as their multiplicand input signals, arithmetic zeroes are subsequently clocked for the remainder of the channel word interval to the adder 126 as its first summand input signal, to the subtractor 128 as its subtrahend input signal, to the subtractors 182 and 204 as their minuend input signals, and to the multipliers 146 and 162 as their multiplicand input signals.

In FIG. 16, a weighted summation circuit 220 generates, as first error signal $e_1$, a weighted summation of the respective energies of the deviations from desired spectral response of the I-NRZI modulation assuming a "positive"-information channel word is next selected for continuing the I-NRZI modulation. The respective energies of these deviations are computed by squaring circuits 140, 156, 172, 196 and 216. A weighted summation circuit 222 generates, as second error signal $e_2$, a weighted summation of the respective energies of the deviations from desired spectral response of the I-NRZI modulation assuming a "negative"-information channel word is next selected for continuing the I-NRZI modulation. The respective energies of these deviations are computed by squaring circuits 142, 158, 174, 198 and 218. A detector (DET) 224 generates a first control signal CS1 and a second control signal CS2 responsive to comparison of the amplitudes of the first error signal $e_1$ and the second error signal $e_2$.

The sum output signals from the adder 126 are supplied to an integrator 130 that calculates a running digital sum of all channel words previously selected for recording and of bit pairs of the "positive"-information channel word being currently considered for recording. A subtractor 134 compares that running digital sum to a prescribed function for the track being recorded for detecting any deviation from that prescribed function, and the squaring circuit 140 computes the energy of that deviation for application to the weighted summation network 220.

The difference output signals from the subtractor 128 are supplied to an integrator 132 that calculates a running digital sum of all channel words previously selected for recording and of bit pairs of the "negative"-information channel word being currently considered for recording. A subtractor 138 compares that running digital sum to a prescribed function for the track being recorded for detecting any deviation from that prescribed function, and the squaring circuit 142 computes the energy of that deviation for application to the weighted summation network 222.

During the recording of a zeroeth set of tracks recorded with the pattern F0, the subtractors 134 and 138 receive arithmetic zero as their respective subtrahend input signals. During the recording of a first set of tracks recorded with the pattern F1, and during the recording of a second set of tracks recorded with the pattern F2, the subtractors 134 and 138 receive as their respective subtrahend input signals a triangular wave from a triangular wave generator 136. Accordingly, in addition to providing for the suppression of the zero-frequency term, the configuration comprising the elements 126–142 provides for the formation of a pilot signal having a peak at frequency $f_1$ during the recording of the first set of tracks and having a peak at frequency $f_2$ during the recording of the second set of tracks. This is done responsive to the triangular wave generator 136 in this configuration generating a triangular wave having a fundamental frequency $f_1$ during the recording of the first set of tracks and generating a triangular wave having a fundamental frequency $f_2$ during the recording of the second set of tracks. The triangular wave generator 136 is typically constructed in ROM sequentially addressed responsive to gated system clock signal.

The triangular wave generator 136 is made up of a ROM and generates the prescribed digital sum value (DSV) corresponding to a triangular wave signal of a prescribed frequency. If the signal generated from the ROM is a triangular wave of frequency $f_1$ (for instance, 1/90T), as shown in FIG. 17A, 8-bit data (for instance, 90A–90R) is stored with 5-bit addresses zero through fifteen in the ROM table as shown in FIG. 17B. This enables a notch to be formed at f=0 Hz (in other words, the DC component) and a pilot signal to be formed at the prescribed frequency $f_1$. Alternatively, a pilot signal can be formed at frequency $f_2=(\omega/2\pi)$.

During the recording of the first set of tracks with the pattern F1, a configuration comprising elements 144–174 provides for the formation of a notch at frequency $f_2=\omega_2/\pi$ in response to the multipliers 144, 146, 160 and 162 receiving as respective multiplier inputs the functions e_sin $\omega_2 t$, o_sin $\omega_2 t$, e_cos $\omega_2 t$, and o_cos $\omega_2 t$ from look-up tables stored in ROM sequentially addressed at system clock rate. The sampled-data functions o_sin $\omega_2 t$ and e_sin $\omega_2 t$ respectively comprise odd-occurring ones and even-occurring ones of the consecutive samples of the sine-wave system function sin $\omega_2 t$. These functions are stored side-by-side in ROM to be read out in pairs as the ROM is sequentially addressed during the early half of the channel word interval. The sampled-data functions o_cos $\omega_2 t$ and e_cos $\omega_2 t$ respectively comprise odd-occurring ones and even-occurring ones of the consecutive samples of the cosine-wave system function cos $\omega_2 t$. These functions are stored side-by-side in ROM to be read out in pairs as the ROM is sequentially addressed during the early half of the channel word interval.

The division of the sine table into an odd-sample sine table and an even-sample sine table within ROM will be more particularly considered. If the waveform of the sine signal is, for instance, 1/60T for frequency $f_2$, as shown in FIG. 18A, one period of the sine signal is divided into 1200 samples, and data are stored in the even-sample and odd-sample sine tables, each of which has six hundred addresses associated with it. In the odd-sample sine table shown in FIG. 19A, data (hereinafter referred to as an "odd sine" signal) corresponding to the odd-occurring samples of the sine-wave signal are stored at 600 successive address locations. In the even-sample sine table shown in FIG. 19B, data (hereinafter referred to as an "even sine" signal) corresponding to the even-occurring samples of the sine-wave signal are stored at 600 successive address locations arranged to be accessed in parallel with corresponding ones of the 600 successive address locations of the odd-sample sine table. Meanwhile, as shown in FIG. 18B, the sine values corresponding to samples (indicated by dots) become odd addresses or even addresses of the sine signal alternately sampled by the period of 25-bit channel word. EB represents the sample-interval in the even channel word where arithmetic zero is inserted. Since the value of sine for each even-occurring sample is to be accessed in parallel at the same time as the value of sine for the immediately preceding odd-occurring sample, the odd-sample sine table can be loaded into ROM at the same addresses as the even-sample sine table, and one address sequencer generating consecutive 9-bit addresses can be used instead of two address sequencers generating staggered 10-bit addresses.

As will be appreciated by those familiar with digital design, certain well-known design stratagems can be used to reduce the overall amount of ROM needed for storing the sine-wave and cosine-wave system functions. The quadrantal symmetry of the sine wave function can be exploited to reduce the amount of ROM fourfold. Furthermore, the ROM can be of banked construction, such that different octants of the sine wave can be separately accessed concurrently, which permits the cosine wave function to be taken from the same ROM as the sine wave function.

During the recording of the second set of tracks with the pattern F2, the configuration comprising elements 144–174 provides for the formation of a notch at frequency $f_1=\omega_1/\pi$ instead of at frequency $f_2$. This is done in response to the multipliers 144, 146, 160 and 162 respectively receiving the sampled-data functions e_sin $\omega_1 t$, o_sin $\omega_1 t$, e_cos $\omega_1 t$, and o_cos $\omega_1 t$ as supplied from look-up tables stored in ROM sequentially addressed at system clock rate, rather than the sampled-data functions e_sin $\omega_2 t$, o_sin $\omega_2 t$, e_cos $\omega_2 t$, and o_cos $\omega_2 t$.

An adder 148 sums the products from the multipliers 144 and 146, and the resulting sum is supplied to an integrator 152, which indicates the amount of the undesired notch frequency of an "imaginary" phase if the I-NRZI code continues with the "positive"-information channel word. The squaring circuit 156 computes the energy of this undesirable notch frequency component for application to the weighted summation network 220.

A subtractor 150 combines the products from the multiplier 144 with negatives of the products from the multiplier 146, and the resulting sum is supplied to an integrator 152, which indicates the amount of the undesired notch frequency of an "imaginary" phase if the I-NRZI code continues with the "negative"-information channel word. The squaring circuit 158 computes the energy of this undesirable notch frequency component for application to the weighted summation network 222.

An adder 164 sums the products from the multipliers 160 and 162, and the resulting sum is supplied to an integrator 168, which indicates the amount of the undesired notch frequency of an "real" phase if the I-NRZI code continues with the "positive"-information channel word. The squaring circuit 172 computes the energy of this undesirable notch frequency component for application to the weighted summation network 220.

A subtractor 166 combines the products from the multiplier 160 with negatives of the products from the multiplier 162, and the resulting sum is supplied to an integrator 170, which indicates the amount of the undesired notch frequency of an "real" phase if the I-NRZI code continues with the "negative"-information channel word. The squaring circuit 174 computes the energy of this undesirable notch frequency component for application to the weighted summation network 222.

During the recording of the first set of tracks with the pattern F1 and during the recording of the second set of tracks with the pattern F2, a configuration comprising elements 176–218 provides for the formation of dips on either side of the pilot signal. Square wave generators 178 and 184 in this configuration generate square waves having a fundamental frequency $f_1$ during the recording of the first set of tracks and generate square waves having a fundamental frequency $f_2$ during the recording of the second set of tracks. The square wave generators 178 and 184 can be constructed in ROM sequentially addressed responsive to gated system clock signal.

During the recording of the first set of tracks with the pattern F1, the configuration comprising elements 176–218 provides for the formation of dips on either side of the pilot signal having frequency $f_1$. This is done in response to the square wave generators 178 and 184 generating square waves with a fundamental frequency $f_1$ and to multipliers 180, 186, 202 and 206 respectively receiving the sampled-data functions $e\_\sin \omega_1 t$, $o\_\sin \omega_1 t$, $e\_\cos \omega_1 t$, and $o\_\cos \omega_1 t$ as supplied from look-up tables stored in ROM sequentially addressed at system clock rate.

During the recording of the second set of tracks with the pattern F2, the configuration comprising elements 176–218 provides for the formation of dips on either side of the pilot signal having frequency $f_2$. This is done in response to the square wave generators 178 and 184 generating square waves with a fundamental frequency $f_2$ and to the multipliers 180, 186, 202 and 206 respectively receiving the sampled-data functions $e\_\sin \omega_2 t$, $o\_\sin \omega_2 t$, $e\_\cos \omega_2 t$, and $o\_\cos \omega_2 t$ as supplied from look-up tables stored in ROM sequentially addressed at system clock rate, rather than the sampled-data functions $e\_\sin \omega_1 t$, $o\_\sin \omega_1 t$, $e\_\cos \omega_2 t$, and $o\_\cos \omega_1 t$.

During the recording of the zeroeth set of tracks with the pattern F0, subtractors 176 and 182 in the configuration comprising elements 176–218 receive arithmetic zero as their respective subtrahend input signals, rather than square waves from the square wave generators 178 and 184. The configuration comprising elements 176–218 accordingly provides for the formation of a notch at one of the frequencies $f_1$ and $f_2$, and the configuration comprising elements 144–174 provides for the formation of a notch at the other of the frequencies $f_1$ and $f_2$. The weighting of the output signals from the squaring circuits 196, 198, 216 and 218 in the weighted summation circuits 220 and 222 is adjusted, to equalize the depths of the notches at the frequencies $f_1$ and $f_2$.

The weighted summation circuit 220 generates the first error signal $e_1$ as a weighted summation of the respective energies of the deviations from desired spectral response of the I-NRZI modulation assuming a "positive"-information channel word is next selected for continuing the I-NRZI modulation; and the weighted summation circuit 222 generates the second error signal $e_2$ as a weighted summation of the respective energies of the deviations from desired spectral response of the I-NRZI modulation assuming a "negative"-information channel word is next selected for continuing the I-NRZI modulation. The detector (DET) 224 includes a comparator which selects a smaller value between error signals e1 and e2. This comparator can take the form of a subtractor that receives error signals e1 and e2 with "0" bit sign extensions as a TWOs complement minuend and as a TWOs complement subtrahend, respectively. The sign bit of the difference output signal of that subtractor is stored in a bit latch for one channel word interval, to furnish to the output port 125 the second control signal CS2 that controls the selection by the selector 122 of one of the "positive"-information or "negative"-information channel words for application to the recorder 124 in FIG. 8. The sign bit of the difference output signal of that subtractor is also used in forming the first control signal CS1 which is supplied from the output port 123 of the control signal generator 120 of FIG. 16 to the precoder 106 of FIGS. 8 and 9A.

The first control signal CS1 is also used within the control signal generator 120 to the control signal input ports of the respective integrators. When the first control signal CS1 is indicative that a "positive"-information channel word was selected for recording, responsive to a reset pulse after the end of a channel word interval, the values of respective integrators 132, 154, 170, 194 and 214 for the 25-bit "negative"-information channel word are replaced with the values stored in respective integrators 130, 152, 168, 192 and 212 corresponding to the 25-bit "positive"-information channel word. When the first control signal CS1 is indicative that a "negative"-information channel word was selected for recording, responsive to the reset pulse after the end of a channel word interval, the values of respective integrators 130, 152, 168, 192 and 212 for the 25-bit "positive"-information channel word are replaced with the values stored in respective integrators 132, 154, 170, 194 and 214 corresponding to the 25-bit "negative"-information channel word.

FIGS. 20A, 20B and 20C show alternative modifications to be made to the FIG. 16 apparatus so that the sync data and run-up data can be I-NRZI coded using the precoder 106 and no other precoder.

When the sync data shown in FIG. 10A are supplied to the 2T precoder 106, in which the initial value is set as "00", the resulting NRZI-coded sync data supplied from the precoder 106 are shown in FIG. 10B. The NRZI-coded sync data shown in FIG. 10C would be generated in response to the sync data shown in FIG. 10A by a 2T precoder, in which the initial value were set as "11". Instead of using such an additional 2T precoder, however, the NRZI-coded sync data shown in FIG. 10C are generated by inverting, or bit-complementing, each and every bit of the sync data shown in FIG. 10B as supplied from the precoder 106.

When the sync data shown in FIG. 10D are supplied to the 2T precoder 106, in which the initial value is set as "00", the resulting NRZI-coded sync data supplied from the precoder 106 are shown in FIG. 10E. The NRZI-coded sync data shown in FIG. 10F would be generated in response to the sync data shown in FIG. 10D by a 2T precoder, in which the initial value were set as "11". Instead of using such an additional 2T precoder, however, the NRZI-coded sync data shown in FIG. 10F are generated by inverting, or bit-complementing, each and every bit of the sync data shown in FIG. 10E as supplied from the precoder 106.

When the run-up data shown in FIG. 10G are supplied to the 2T precoder 106, in which the initial value is set as "00", the resulting NRZI-coded run-up data supplied from the precoder 106 are shown in FIG. 10H. The NRZI-coded run-up data shown in FIG. 10I would be generated in response to the run-up data shown in FIG. 10G by a 2T precoder, in which the initial value were set as "11". Instead of using such an additional 2T precoder, however, the NRZI-coded run-up data shown in FIG. 10I are generated by inverting, or bit-complementing, each and every bit of the run-up data shown in FIG. 10H as supplied from the precoder 106.

That is, the even-occurring bits supplied from the output port 117 of the fourth P/S converter 114, as well as the odd occurring bits from the output port 115 of the third P/S converter 112, need to be bit-complemented in order to generate from the precoder 106 code output the NRZI-coded sync data shown in FIG. 10C or 10F. Similarly, the even-occurring bits supplied from the output port 117 of the fourth P/S converter 114, as well as the odd-occurring bits from the output port 115 of the third P/S converter 112, need to be bit-complemented in order to generate from the precoder 106 code output the NRZI-coded run-up data shown in FIG. 10I.

FIG. 20A shows an alternative implementation of the circuitry within the dashed-line rectangle surrounding elements 126-132 of FIG. 16, so to accommodate the signals supplied via output ports 115 and 117 at times comprising sync data or run-up data. Adder 230, subtractor 232, integrator 234 and integrator 236 respectively correspond to the adder 126, subtractor 128, integrator 130 and integrator 132 in FIG. 16. Where the FIG. 20A modification is made to the circuitry within the dashed-line block surrounding elements 126-132 of FIG. 16, similar modification is made in FIG. 16 to the circuitry within the dashed-line block surrounding elements 148-154, the circuitry within the dashed-line block surrounding elements 164-170, the circuitry within the dashed-line block surrounding elements 188-194, and the circuitry within the dashed-line block surrounding elements 208-214.

A multiplier 226 multiplies, each by -1, the +1 or -1 terms described by the successive bits of the even channel words supplied from output port 117 of the fourth P/S converter 114. If a sync/run-up control signal indicates that the present input data is either sync or run-up data, a controlled switch 228 responds to select the output of the multiplier 226 as minuend input to the subtractor 232. This negatives the arithmetic values of the even-occurring bits supplied from the output port 117 of the fourth P/S converter 114, as well as the arithmetic values of the odd-occurring bits from the output port 115 of the third P/S converter 112 being negatived by the subtractor 232. The difference output signal from the subtractor 232 is indicative of the arithmetic values of NRZI-coded sync or run-up data as would be coded by a 2T precoder, in which the initial value were set as "11".

If the sync/run-up control signal is of a condition that indicates the present input data is neither sync or run-up data, the controlled switch 228 selects the +1 or -1 terms described by the successive bits of the even channel words supplied from output port 117 of the fourth P/S converter 114 to the subtractor 232 as its minuend input. The subtractor 232 subtracts odd channel words from the output selected by the controlled switch 228, and the resulting difference signal is the same as previously described for FIG. 16.

In either of the modes of operation respectively described in the foregoing two paragraphs, the adder 230 adds the +1 or -1 terms described by the successive bits of the odd channel words supplied from the output port 115 of the third P/S converter 112 to the concurrent +1 or -1 terms described by the successive bits of the even channel words supplied from the output port 117 of the fourth P/S converter 114. An integrator 234 accumulates the resulting sums with the digital sum value of previously recorded I-NRZI codes, the energy of the integrator 234 accumulation result is determined by squaring and the result supplied to the weighted summation network 220. An integrator 236 accumulates the difference signals from the subtractor 232 with the digital sum value of previously recorded I-NRZI codes, the energy of the integrator 236 accumulation result is determined by squaring, and the result is supplied to the weighted summation network 222.

FIG. 20B shows an alternative modification of the circuitry within the dashed-line rectangle surrounding elements 126-132 of FIG. 16, to accommodate the signals supplied via output ports 115 and 117 at times comprising sync data or run-up data. Adder 242, subtractor 244, integrator 250 and integrator 252 respectively correspond to the adder 126, subtractor 128, integrator 130 and integrator 132 in FIG. 16. Where the FIG. 20B modification is made to the circuitry within the dashed-line block surrounding elements 126-132 of FIG. 16, similar modification is made in FIG. 16 to the circuitry within the dashed-line block surrounding elements 148-154, the circuitry within the dashed-line block surrounding elements 164-170, the circuitry within the dashed-line block surrounding elements 188-194, and the circuitry within the dashed-line block surrounding elements 208-214.

The adder 242 adds the +1 or -1 terms described by the successive bits of the odd channel words supplied from the output port 115 of the third P/S converter 112 to the concurrent +1 or -1 terms described by the successive bits of the even channel words supplied from the output port 117 of the fourth P/S converter 114. An integrator 250 accumulates the resulting sums with the digital sum value of previously recorded I-NRZI codes, the energy of the integrator 250 accumulation result is determined by squaring and the result supplied to the weighted summation network 220.

The subtractor 244 receives as minuend input signal the +1 or -1 terms described by the successive bits of the even channel words supplied from the output port 117 of the fourth P/S converter 114. A multiplier 238 multiplies, each by -1, the +1 or -1 terms described by the successive bits of the odd channel words supplied from the output port 115 of the third P/S converter 112. Another multiplier 246 multiplies each output signal from the subtractor 244 by -1.

If the sync/run-up control signal is of a condition that indicates the present input data is neither sync or run-up data, a controlled switch 240 responds by selecting the odd channel words supplied from the output port 115 of the third P/S converter 112 for application as subtrahend input to the subtractor 244; and a controlled switch 248 responds by selecting the output signal from the subtractor 244 for application to the integrator 252. The integrator 252 accumulates the output signal from the controlled switch 248 with the digital sum value of previously recorded I-NRZI codes, the energy of the integrator 252 accumulation result is determined by squaring, and the result is supplied to the weighted summation network 222. Since the output signal from the controlled switch 248 reproduces the output signal from the subtractor 244, the operation is the same as previously described for FIG. 16.

If a sync/run-up control signal indicates that the present input data is either sync or run-up data, the controlled switch 240 responds by selecting the output of the multiplier 238 as subtrahend input to the subtractor 244. This negatives the arithmetic values of the odd-occurring bits supplied from the output port 115 of the fourth P/S converter 112, resulting in the subtractor 244 operating as an adder. The output signal from the subtractor 244 is indicative of the negatives of the arithmetic values of NRZI-coded sync or run-up data as would be coded by a 2T precoder, in which the initial value were set as "11". The multiplier 246 multiplies each output signal from the subtractor 244 by −1, to generate the arithmetic values of NRZI-coded sync or run-up data as would be coded by a 2T precoder, in which the initial value were set as "11". The controlled switch 248 responds to the sync/run-up control signal indicating that the present input data is either sync or run-up data by selecting the products from the multiplier 246 for application as input signal to the integrator 252. So, the integrator 252 accumulates the arithmetic values of NRZI-coded sync or run-up data as would be coded by a 2T precoder, in which the initial value were set as "11", with the digital sum value of previously recorded I-NRZI codes. The energy of the integrator 252 accumulation result is determined by squaring, and the result is supplied to the weighted summation network 222.

FIG. 20C shows still another different modification of the circuitry within the dashed-line rectangle surrounding elements 126–132 of FIG. 16, to accommodate the signals supplied via output ports 115 and 117 at times comprising sync data or run-up data. Adder 254, subtractor 256, integrator 262 and integrator 264 respectively correspond to the adder 126, subtractor 128, integrator 130 and integrator 132 in FIG. 16. Where the FIG. 20C modification is made to the circuitry within the dashed-line block surrounding elements 126–132 of FIG. 16, similar modification is made in FIG. 16 to the circuitry within the dashed-line block surrounding elements 148–154, the circuitry within the dashed-line block surrounding elements 164–170, the circuitry within the dashed-line block surrounding elements 188–194, and the circuitry within the dashed-line block surrounding elements 208–214.

The adder 254 adds the +1 or −1 terms described by the successive bits of the odd channel words supplied from the output port 115 of the third P/S converter 112 to the concurrent +1 or −1 terms described by the successive bits of the even channel words supplied from the output port 117 of the fourth P/S converter 114. An integrator 262 accumulates the resulting sums with the digital sum value of previously recorded I-NRZI codes, the energy of the integrator 262 accumulation result is determined by squaring and the result supplied to the weighted summation network 220.

The subtractor 256 subtracts the +1 or −1 terms described by the successive bits of the odd channel words supplied from the output port 115 of the third P/S converter 112 from the concurrent +1 or −1 terms described by the successive bits of the even channel words supplied from the output port 117 of the fourth P/S converter 114. The resulting differences are supplied from the subtractor 2566 to a controlled switch 260 as a first of its two input signals to be selected at times as the output signal of the switch 260, which output signal is supplied to an integrator 264 as its input signal. A multiplier 258 multiplies by −1 the output sum output signal from the adder 254, the resulting product being applied as second input signal to the controlled switch 260. The integrator 264 accumulates the output signal from the controlled switch 260 with the digital sum value of previously recorded I-NRZI codes, the energy of the integrator 264 accumulation result is determined by squaring, and the result is supplied to the weighted summation network 222.

If the sync/run-up control signal is of a condition that indicates the present input data is neither sync or run-up data, the controlled switch 260 selects the differences supplied from the adder 254 for application to the integrator 264 and operation is the same as previously described for FIG. 16. If the sync/run-up control signal indicates that the present input data is either sync or run-up data, the controlled switch 260 selects the output of the multiplier 258 for application to the integrator 264. The integrator 264 integrates the ONEs complement of the signal integrated by the integrator 262.

Other alternative embodiments of the invention, in addition to those thusfar described, will be apparent to one skilled in the art of digital tape recorder design and acquainted with the foregoing specification; and such alternative embodiments are intended to be considered as being within the scope of the claims appended to this specification. By way of specific example, the triangular wave generator 136 of FIG. 16 can be replaced by a triangular wave generator generating a triangular wave complementary to that generated by the generator 136, and the subtractors 134 and 138 replaced by respective adders, without changing operation. By way of further specific example, the square wave generators 178 and 184 of FIG. 16 can be replaced by square wave generators generating square waves complementary to those generated by the generators 178 and 184, and the subtractors 176, 182, 200 and 204 replaced by respective adders, without changing operation. Methods of estimating the energies of deviations from their absolute values, rather than squaring the deviations, are known to digital designers, and circuitry using such methods are equivalents of the squaring circuitry shown in FIG. 16. The lone precoder is one generating "negative"-information NRZI code, rather than one generating "positive"-information NRZI code, in alternative embodiments of the invention; and changes are made in the control generator to suit.

What is claimed is:

1. Digital signal recording apparatus for recording using interleaved non-return to-zero, invert-on-ONEs (I-NRZI) modulation, said digital signal recording apparatus comprising:

an input port for receiving n-parallel-bit information words, n being an even positive integer;

a precoder for I-NRZI coding (n+1)-parallel-bit information words formed by introducing a control bit of a predetermined bit value into each of said n-parallel-bit information words, thereby producing a first of two kinds of (n+1)-bit channel words rather than a second of said two kinds of (n+1)-bit channel words as would be produced were said control bit to have an opposite bit value the complement of said predetermined bit value, said precoder being initialized according to a first control signal;

a time-share multiplexer for separating each said (n+1)-parallel-bit channel word supplied from said precoder into a first bit group, the bits of which would be complemented were the predetermined bit value of said control bit to be the complement of said predetermined bit value, and into a second bit group, the bits of which would be unchanged were the predetermined bit value of said control bit to be the complement of said predetermined bit value, and for supplying said first and second bit groups concurrently;

a first parallel-to-serial converter for generating a first serial-bit signal by converting each said (n+1)-parallelbit channel word of said first kind supplied from said precoder into an (n+1)-serial-bit channel word of said first kind;

a second parallel-to-serial converter for generating a second serial-bit signal by complementing only the bits in said first bit group in said (n+1)-parallel-bit channel word supplied from said precoder and then converting a resulting (n+1)-parallel-bit channel word of said second kind into a (n+1)-serial-bit channel word of said second kind;

a recorder for recording, on parallel tracks of a record medium, said I-NRZI modulation according to an I-NRZI code generated by selecting one of said first converting means output signal and said second converting means output signal, the selection being made in response to a second control signal; and a control signal generator, responsive to said first and second bit groups concurrently supplied by said time-share multiplexer, for generating said first and second control signals, said first and second control signals being generated so as to be indicative of which of said first and said second serial-bit signals should be selected for inclusion in said I-NRZI code in order to minimize deviation of said I-NRZI modulation from a spectral response prescribed for one of said tracks being currently recorded.

2. Digital signal recording apparatus as claimed in claim 1, wherein said precoder is a 2T precoder for I-NRZI coding said (n+1)-bit information words formed by affixing said control bit of predetermined bit value to each of said n-parallel-bit information words as a respective prefix bit.

3. Digital signal recording apparatus as claimed in claim 2, wherein said (n+1)-bit information words are formed by affixing a respective ZERO prefix bit to each of said n-parallel-bit information words.

4. Digital signal recording apparatus as claimed in claim 2, wherein said time-share multiplexer comprises:

a third parallel-to-serial converter for converting said first group of bits as selected from said (n+1)-parallel-bit channel word of said first kind supplied from said precoder into a serial-bit odd channel word, and a fourth parallel-to-serial converter for converting said second group of bits as selected from said (n+1)-parallel-bit channel word of said first kind supplied from said precoder into a serial-bit even channel word.

5. Digital signal recording apparatus as claimed in claim 4, wherein said control signal generator comprises:

circuitry for generating said first and second control signals in response to whether or not a first error signal is exceeded in amplitude by a second error signal;

first combining circuitry for additively combining unit quantities, the polarities of which are determined by the bits of each said serial-bit odd channel word supplied from said time-share multiplexer, with further unit quantities, the polarities of which are determined the bits of said serial-bit even channel word concurrently supplied from said time-share multiplexer, to generate first combining results;

a first integrator for integrating said first combining results together with a first integrator initial integration value, thus to generate a first integrator output signal equal to a first running digital sum value as would obtain if a channel word of said first kind were next selected for recording;

second combining circuitry for differentially combining said unit quantities, the polarities of which are determined by the bits of each said serial-bit odd channel word supplied from said time-share multiplexer, with said further unit quantities, the polarities of which are determined the bits of said serial-bit even channel word concurrently supplied from said time-share multiplexer, to generate second combining results;

a second integrator for integrating said second combining results together with a second integrator initial integration value, thus to generate a second integrator output signal equal to a second running digital sum value as would obtain if a channel word of said second kind were next selected for recording, said first and second integrator initial integration values being the same and equaling the one of said first and second integrator output signals for the channel word previously selected for recording;

circuitry for computing the energy of any deviation of said first running digital sum from a prescribed running digital sum value for said one of said tracks being currently recorded, the result of computing the energy of any such deviation of first running digital sum being included in said first error signal; and circuitry for computing the energy of any deviation of second running digital sum from said prescribed running digital sum value for said one of said tracks being currently recorded, the result of computing the energy of any deviation of said second running digital sum being included in said second error signal.

6. Digital signal recording apparatus as claimed in claim 5, wherein said control signal generator further comprises:

circuitry for generating said first and second control signals in response to whether or not a first error signal is exceeded in amplitude by a second error signal;

circuitry for generating even-occurring ones of successive samples of a sampled-data sine wave system function of a notch frequency and multiplying them by respective unit quantities, the polarities of which are determined by the bits of each said serial-bit even channel word supplied from said time-share multiplexer, to generate a first product stream;

circuitry for generating odd-occurring ones of successive samples of a sampled-data sine wave system function of said notch frequency and multiplying them by respective unit quantities, the polarities of which are determined by the bits of each said serial-bit odd channel word supplied from said time-share multiplexer, to generate a second product stream;

third combining circuitry for additively combining said first and second product streams to generate third combining results;

a third integrator for integrating said third combining results together with a third integrator initial integration value, thus to generate a third integrator output signal;

circuitry for computing the energy of said third integrator output signal, the result of computing the energy of said third integrator output signal being included in said first error signal;

fourth combining circuitry for differentially combining said first and second product streams to generate fourth combining results;

a fourth integrator for integrating said fourth combining results together with a fourth integrator initial integration value, thus to generate a fourth integrator output signal, said third and fourth integrator initial integration values being the same and equaling the one of said third and fourth integrator output signals for the channel word previously selected for recording;

circuitry for computing the energy of said fourth integrator output signal, the result of computing the energy of said fourth integrator output signal being included in said second error signal;

circuitry for generating even-occurring ones of successive samples of a sampled-data cosine wave system function of said notch frequency and multiplying them by respective unit quantities, the polarities of which are determined by the bits of each said serial-bit even channel word supplied from said time-share multiplexer, to generate a third product stream;

circuitry for generating odd-occurring ones of successive samples of a sampled-data cosine wave system function of said notch frequency and multiplying them by respective unit quantities, the polarities of which are determined by the bits of each said serial-bit odd channel word supplied from said time-share multiplexer, to generate a fourth product stream;

fifth combining circuitry for additively combining said third and fourth product streams to generate fifth combining results;

a fifth integrator for integrating said fifth combining results together with a fifth integrator initial integration value, thus to generate a fifth integrator output signal;

circuitry for computing the energy of said fifth integrator output signal, the result of computing the energy of said fifth integrator output signal being included in said first error signal;

sixth combining circuitry for differentially combining said third and fourth product streams to generate sixth combining results;

a sixth integrator for integrating said sixth combining results together with a sixth integrator initial integration value, thus to generate a sixth integrator output signal, said fifth and sixth integrator initial integration values being the same and equaling the one of said fifth and sixth integrator output signals for the channel word previously selected for recording; and circuitry for computing the energy of said sixth integrator output signal, the result of computing the energy of said sixth integrator output signal being included in said second error signal.

7. Digital signal recording apparatus as claimed in claim 5, wherein said control signal generator further comprises:

circuitry for generating a triangular wave of a prescribed first frequency as said prescribed running digital sum value when each of a first set of tracks is recorded.

8. Digital signal recording apparatus as claimed in claim 7 for recording each of said first set of tracks with I-NRZI modulation with a spectral notch at a second frequency having real and imaginary phases, to which end said control signal generator further comprises:

circuitry for generating even-occurring ones of successive samples of a sampled-data sine wave system function of said second frequency and multiplying them by respective unit quantities, the polarities of which are determined by the bits of each said serial-bit even channel word supplied from said time-share multiplexer, to generate a first product stream;

circuitry for generating odd-occurring ones of successive samples of a sampled-data sine wave system function of said second frequency and multiplying them by respective unit quantities, the polarities of which are determined by the bits of each said serial-bit odd channel word supplied from said time-share multiplexer, to generate a second product stream;

third combining circuitry for additively combining said first and second product streams to generate third combining results;

a third integrator for integrating said third combining results together with a third integrator initial integration value, thus to generate a third integrator output signal;

circuitry for computing the energy of said third integrator output signal, the result of computing the energy of said third integrator output signal being included in said first error signal;

fourth combining circuitry for differentially combining said first and second product streams to generate fourth combining results;

a fourth integrator for integrating said fourth combining results together with a fourth integrator initial integration value, thus to generate a fourth integrator output signal, said third and fourth integrator initial integration values being the same and equaling the one of said third and fourth integrator output signals for the channel word previously selected for recording;

circuitry for computing the energy of said fourth integrator output signal, the result of computing the energy of said fourth integrator output signal being included in said second error signal;

circuitry for generating even-occurring ones of successive samples of a sampled-data cosine wave system function of said second frequency and multiplying them by respective unit quantities, the polarities of which are determined by the bits of each said serial-bit even channel word supplied from said time-share multiplexer, to generate a third product stream;

circuitry for generating odd-occurring ones of successive samples of a sampled-data cosine wave system function of said second frequency and multiplying them by respective unit quantities, the polarities of which are determined by the bits of each said serial-bit odd channel word supplied from said time-share multiplexer, to generate a fourth product stream;

fifth combining circuitry for additively combining said third and fourth product streams to generate fifth combining results;

a fifth integrator for integrating said fifth combining results together with a fifth integrator initial integration value, thus to generate a fifth integrator output signal;

circuitry for computing the energy of said fifth integrator output signal, the result of computing the energy of said fifth integrator output signal being included in said first error signal;

sixth combining circuitry for differentially combining said third and fourth product streams to generate sixth combining results;

a sixth integrator for integrating said sixth combining results together with a sixth integrator initial integration value, thus to generate a sixth integrator output signal, said fifth and sixth integrator initial integration values being the same and equaling the one of said fifth and sixth integrator output signals for the channel word previously selected for recording; and circuitry for computing the energy of said sixth integrator output signal, the result of computing the energy of said sixth integrator output signal being included in said second error signal.

9. Digital signal recording apparatus as claimed in claim 8 for recording each of said first set of tracks with I-NRZI modulation having spectral dips on each side of said first frequency, to which end said control signal generator further comprises:

circuitry for generating even-occurring ones of successive samples of a square wave system function of said first frequency and combining them with respective unit quantities, the polarities of which are determined by the bits of each said serial-bit even channel word supplied from said time-share multiplexer, to generate a first multiplicand stream;

circuitry for generating odd-occurring ones of successive samples of a square wave system function of said first frequency and combining them with respective unit quantities, the polarities of which are determined by the bits of each said serial-bit odd channel word supplied from said time-share multiplexer, to generate a second multiplicand stream;

circuitry for generating even-occurring ones of successive samples of a sampled-data sine wave system function of said first frequency and multiplying them by respective samples of said first multiplicand stream, to generate a fifth product stream;

circuitry for generating odd-occurring ones of successive samples of a sampled-data sine wave system function of said first frequency and multiplying them by respective samples of said first multiplicand stream, to generate a sixth product stream;

seventh combining circuitry for additively combining said fifth and sixth product streams to generate seventh combining results;

a seventh integrator for integrating said seventh combining results together with a seventh integrator initial integration value, thus to generate a seventh integrator output signal;

circuitry for computing the energy of said seventh integrator output signal, the result of computing the energy of said seventh integrator output signal being included in said first error signal;

eighth combining circuitry for differentially combining said fifth and sixth product streams product streams to generate eighth combining results;

an eighth integrator for integrating said eighth combining results together with an eighth integrator initial integration value, thus to generate an eighth integrator output signal, said seventh and eighth integrator initial integration values being the same and equaling the one of said seventh and eighth integrator output signals for the channel word previously selected for recording;

circuitry for computing the energy of said eighth integrator output signal, the result of computing the energy of said eighth integrator output signal being included in said second error signal;

circuitry for generating even-occurring ones of successive samples of a sampled-data cosine wave system function of said first frequency and multiplying them by respective samples of said second multiplicand stream, to generate a seventh product stream;

circuitry for generating odd-occurring ones of successive samples of a sampled-data cosine wave system function of said first frequency and multiplying them by respective samples of said second multiplicand stream, to generate an eighth product stream;

ninth combining circuitry for additively combining said seventh and eighth product streams to generate ninth combining results;

a ninth integrator for integrating said ninth combining results together with a ninth integrator initial integration value, thus to generate a ninth integrator output signal;

circuitry for computing the energy of said ninth integrator output signal, the result of computing the energy of said ninth integrator output signal being included in said first error signal;

tenth combining circuitry for differentially combining said seventh and eighth product streams to generate tenth combining results;

a tenth integrator for integrating said tenth combining results together with a tenth integrator initial integration value, thus to generate a tenth integrator output signal, said ninth and tenth integrator initial integration values being the same and equaling the one of said ninth and tenth integrator output signals for the channel word previously selected for recording;

circuitry for computing the energy of said tenth integrator output signal, the result of computing the energy of said tenth integrator output signal being included in said second error signal.

10. Digital signal recording apparatus as claimed in claim 7 for recording each of said first set of tracks with I-NRZI modulation having spectral dips on each side of said first frequency, to which end said control signal generator further comprises:

circuitry for generating even-occurring ones of successive samples of a square wave system function of said first frequency and combining them with respective unit quantities, the polarities of which are determined by the bits of each said serial-bit even channel word supplied from said time-share multiplexer, to generate a first multiplicand stream;

circuitry for generating odd-occurring ones of successive samples of a square wave system function of said first frequency and combining them with respective unit quantities, the polarities of which are determined by the bits of each said serial-bit odd channel word supplied from said time-share multiplexer, to generate a second multiplicand stream;

circuitry for generating even-occurring ones of successive samples of a sampled-data sine wave system function of said first frequency and multiplying them by respective samples of said first multiplicand stream, to generate a first product stream;

circuitry for generating odd-occurring ones of successive samples of a sampled-data sine wave system function of said first frequency and multiplying them by respective samples of said first multiplicand stream, to generate a second product stream;

third combining circuitry for additively combining said first and second product streams to generate third combining results;

a third integrator for integrating said third combining results together with a third integrator initial integration value, thus to generate a third integrator output signal;

circuitry for computing the energy of said third integrator output signal, the result of computing the energy of said third integrator output signal being included in said first error signal;

fourth combining circuitry for differentially combining said first and second product streams to generate fourth combining results;

a fourth integrator for integrating said fourth combining results together with a fourth integrator initial integration value, thus to generate a fourth integrator output signal, said third and fourth integrator initial integration values being the same and equaling the one of said third and fourth integrator output signals for the channel word previously selected for recording;

circuitry for computing the energy of said fourth integrator output signal, the result of computing the energy of said fourth integrator output signal being included in said second error signal;

circuitry for generating even-occurring ones of successive samples of a sampled-data cosine wave system function of said first frequency and multiplying them by respective samples of said second multiplicand stream, to generate a third product stream;

circuitry for generating odd-occurring ones of successive samples of a sampled-data cosine wave system function of said first frequency and multiplying them by respective samples of said second multiplicand stream, to generate a fourth product stream;

fifth combining circuitry for additively combining said third and fourth product streams to generate fifth combining results;

a fifth integrator for integrating said fifth combining results together with a fifth integrator initial integration value, thus to generate a fifth integrator output signal;

circuitry for computing the energy of said fifth integrator output signal, the result of computing the energy of said fifth integrator output signal being included in said first error signal;

sixth combining circuitry for differentially combining said third and fourth product streams to generate sixth combining results;

a sixth integrator for integrating said sixth combining results together with a sixth integrator initial integration value, thus to generate a sixth integrator output signal, said fifth and sixth integrator initial integration values being the same and equaling the one of said fifth and sixth integrator output signals for the channel word previously selected for recording; and circuitry for computing the energy of said sixth integrator output signal, the result of computing the energy of said sixth integrator output signal being included in said second error signal.

11. Digital signal recording apparatus for recording interleaved non-return to-zero, invert-on-ONEs (I-NRZI) modulation on parallel tracks of a record medium; each of which tracks has an initial second track part where preamble information is recorded, has a succeeding first track part where video information is recorded, has a succeeding fourth track part where run-up information is recorded, has a final fifth track part where postamble information is recorded; sync data being recorded at the beginning of respective lines of first and third track parts where video information and audio information are recorded; a run-up data information word recorded on said fourth track part for controlling a phase-locked loop circuit used for bit detection during playback from said record medium, said apparatus comprising:

an input port for receiving n-parallel-bit information words, n being an even positive integer;

a precoder for I-NRZI coding (n+1)-parallel-bit information words formed by introducing a control bit of a predetermined bit value into each of said n-parallel-bit information words, said precoder being initialized according to a two-bit initializing signal;

a time-share multiplexer for separating each said (n+1)-parallel-bit channel word supplied from said precoder into a first bit group, the bits of which would be complemented were the predetermined bit value of said control bit to be the complement of said predetermined bit value, and into a second bit group, the bits of which would be unchanged were the predetermined bit value of said control bit to be the complement of said predetermined bit value, and for supplying said first and second bit groups concurrently;

a first parallel-to-serial converter for generating a first serial-bit signal by converting each said (n+1)-parallel-bit channel word of said first kind supplied from said precoder into an (n+1)-serial-bit channel word of said first kind;

a second parallel-to-serial converter for generating a second serial-bit signal by complementing only the bits in said first bit group in said (n+1)-parallel-bit channel word supplied from said precoder and then converting a resulting (n+1)-parallel-bit channel word of said second kind into a (n+1)-serial-bit channel word of said second kind;

a recorder for recording, on parallel tracks of a record medium, said I-NRZI modulation according to an I-NRZI code generated by selecting one of said first converting means output signal and said second converting means output signal, the selection being made in response to a control signal; and a control signal generator, responsive to said first and second bit groups concurrently supplied by said time-share multiplexer, for generating said control signal, so as to be indicative of which of said first and said second serial-bit signals should be selected for inclusion in said I-NRZI code in order to minimize deviation of said I-NRZI modulation from a spectral response prescribed for one of said tracks being currently recorded.

12. Digital signal recording apparatus as claimed in claim 11, wherein said precoder is a 2T precoder initialized for I-NRZI coding said (n+1)-bit information words by taking the initial value as "00" and thereafter generating a respective (n+1)-bit channel word in response to each of said (n+1)-bit information words.

13. Digital signal recording apparatus as claimed in claim 12, wherein said time-share multiplexer comprises:

a third parallel-to-serial converter for converting said first group of bits as selected from said (n+1)-parallel-bit channel word of said first kind supplied from said precoder into a serial-bit odd channel word, and a fourth parallel-to-serial converter for converting said second group of bits as selected from said (n+1)-parallel-bit channel word of said first kind supplied from said precoder into a serial-bit even channel word.

14. Digital signal recording apparatus as claimed in claim 13, wherein said control signal generator comprises:

means for supplying an indication when bits of sync data or run-up data are being supplied from said fourth parallel-to-serial converter;

circuitry for generating said control signal in response to whether or not a first error signal is exceeded in amplitude by a second error signal;

first combining circuitry for additively combining unit quantities, the polarities of which are determined by the bits of each said serial-bit odd channel word supplied from said time-share multiplexer, with further unit quantities, the polarities of which are determined the bits of said serial-bit even channel word concurrently supplied from said time-share multiplexer, to generate first combining results;

a first integrator for integrating said first combining results together with a first integrator initial integration value, thus to generate a first integrator output signal equal to a first running digital sum value as would obtain if a channel word of said first kind were next selected for recording;

second combining circuitry for combining said unit quantities, the polarities of which are determined by the bits of each said serial-bit odd channel word supplied from said time-share multiplexer, with said further unit quantities, the polarities of which are determined the bits of said serial-bit even channel word concurrently supplied from said time-share multiplexer, to generate second combining results, the combining by said second combining circuitry being additive combining when an indication is supplied that bits of sync data or run-up data are being supplied from said fourth parallel-to-serial converter, and the combining by said second combining circuitry being differential combining when no indication is supplied that bits of sync data or run-up data are being supplied from said fourth parallel-to-serial converter;

a second integrator for integrating said second combining results together with a second integrator initial integration value, thus to generate a second integrator output signal equal to a second running digital sum value as would obtain if a channel word of said second kind were next selected for recording, said first and second integrator initial integration values being the same and equaling the one of said first and second integrator output signals for the channel word previously selected for recording;

circuitry for computing the energy of any deviation of said first running digital sum from a prescribed running digital sum value for said one of said tracks being currently recorded, the result of computing the energy of any such deviation of first running digital sum being included in said first error signal; and circuitry for computing the energy of any deviation of second running digital sum from said prescribed running digital sum value for said one of said tracks being currently recorded, the result of computing the energy of any deviation of said second running digital sum being included in said second error signal.

15. Digital signal recording apparatus as claimed in claim 14, wherein said control signal generator further comprises:

circuitry for generating a triangular wave of a prescribed first frequency as said prescribed running digital sum value when each of a first set of tracks is recorded.

16. Digital signal recording apparatus as claimed in claim 15 for recording each of said first set of tracks with I-NRZI modulation with a spectral notch at a second frequency having real and imaginary phases, to which end said control signal generator further comprises:

circuitry for generating even-occurring ones of successive samples of a sampled-data sine wave system function of said second frequency and multiplying them by respective unit quantities, the polarities of which are determined by the bits of each said serial-bit even channel word supplied from said time-share multiplexer, to generate a first product stream;

circuitry for generating odd-occurring ones of successive samples of a sampled-data sine wave system function of said second frequency and multiplying them by respective unit quantities, the polarities of which are determined by the bits of each said serial-bit odd channel word supplied from said time-share multiplexer, to generate a second product stream;

third combining circuitry for additively combining said first and second product streams to generate third combining results;

a third integrator for integrating said third combining results together with a third integrator initial integration value, thus to generate a third integrator output signal;

circuitry for computing the energy of said third integrator output signal, the result of computing the energy of said third integrator output signal being included in said first error signal;

fourth combining circuitry for combining said first and second product streams to generate fourth combining results, the combining by said fourth combining circuitry being additive combining when an indication is supplied that bits of sync data or run-up data are being supplied from said fourth parallel-to-serial converter, and the combining by said fourth combining circuitry being differential combining when no indication is supplied that bits of sync data or run-up data are being supplied from said fourth parallel-to-serial converter;

a fourth integrator for integrating said fourth combining results together with a fourth integrator initial integration value, thus to generate a fourth integrator output signal, said third and fourth integrator initial integration values being the same and equaling the one of said third and fourth integrator output signals for the channel word previously selected for recording;

circuitry for computing the energy of said fourth integrator output signal, the result of computing the energy of said fourth integrator output signal being included in said second error signal;

circuitry for generating even-occurring ones of successive samples of a sampled-data cosine wave system function of said second frequency and multiplying them by respective unit quantities, the polarities of which are determined by the bits of each said serial-bit even channel word supplied from said time-share multiplexer, to generate a third product stream;

circuitry for generating odd-occurring ones of successive samples of a sampled-data cosine wave system function of said second frequency and multiplying them by respective unit quantities, the polarities of which are determined by the bits of each said serial-bit odd channel word supplied from said time-share multiplexer, to generate a fourth product stream;

fifth combining circuitry for additively combining said third and fourth product streams to generate fifth combining results;

a fifth integrator for integrating said fifth combining results together with a fifth integrator initial integration value, thus to generate a fifth integrator output signal;

circuitry for computing the energy of said fifth integrator output signal, the result of computing the energy of said fifth integrator output signal being included in said first error signal;

sixth combining circuitry for differentially combining said third and fourth product streams to generate sixth combining results, the combining by said sixth combining circuitry being additive combining when an indication is supplied that bits of sync data or run-up data are being supplied from said fourth parallel-toserial converter, and the combining by said sixth combining circuitry being differential combining when no indication is supplied that bits of sync data or run-up data are being supplied from said fourth parallel-to-serial converter;

a sixth integrator for integrating said sixth combining results together with a sixth integrator initial integration value, thus to generate a sixth integrator output signal, said fifth and sixth integrator initial integration values being the same and equaling the one of said fifth and sixth integrator output signals for the channel word previously selected for recording; and circuitry for computing the energy of said sixth integrator output signal, the result of computing the energy of said sixth integrator output signal being included in said second error signal.

17. Digital signal recording apparatus as claimed in claim 16 for recording each of said first set of tracks with I-NRZI modulation having spectral dips on each side of said first frequency, to which end said control signal generator further comprises:

circuitry for generating even-occurring ones of successive samples of a square wave system function of said first frequency and combining them with respective unit quantities, the polarities of which are determined by the bits of each said serial-bit even channel word supplied from said time-share multiplexer, to generate a first multiplicand stream;

circuitry for generating odd-occurring ones of successive samples of a square wave system function of said first frequency and combining them with respective unit quantities, the polarities of which are determined by the bits of each said serial-bit odd channel word supplied from said time-share multiplexer, to generate a second multiplicand stream;

circuitry for generating even-occurring ones of successive samples of a sampled-data sine wave system function of said first frequency and multiplying them by respective samples of said first multiplicand stream, to generate a fifth product stream;

circuitry for generating odd-occurring ones of successive samples of a sampled-data sine wave system function of said first frequency and multiplying them by respective samples of said first multiplicand stream, to generate a sixth product stream;

seventh combining circuitry for additively combining said fifth and sixth product streams to generate seventh combining results;

a seventh integrator for integrating said seventh combining results together with a seventh integrator initial integration value, thus to generate a seventh integrator output signal;

circuitry for computing the energy of said seventh integrator output signal, the result of computing the energy of said seventh integrator output signal being included in said first error signal;

eighth combining circuitry for differentially combining said fifth and sixth product streams product streams to generate eighth combining results, the combining by said eighth combining circuitry being additive combining when an indication is supplied that bits of sync data or run-up data are being supplied from said fourth parallel-to-serial converter, and the combining by said eighth combining circuitry being differential combining when no indication is supplied that bits of sync data or run-up data are being supplied from said fourth parallel-to-serial converter;

an eighth integrator for integrating said eighth combining results together with an eighth integrator initial integration value, thus to generate an eighth integrator output signal, said seventh and eighth integrator initial integration values being the same and equaling the one of said seventh and eighth integrator output signals for the channel word previously selected for recording;

circuitry for computing the energy of said eighth integrator output signal, the result of computing the energy of said eighth integrator output signal being included in said second error signal;

circuitry for generating even-occurring ones of successive samples of a sampled-data cosine wave system function of said first frequency and multiplying them by respective samples of said second multiplicand stream, to generate a seventh product stream;

circuitry for generating odd-occurring ones of successive samples of a sampled-data cosine wave system function of said first frequency and multiplying them by respective samples of said second multiplicand stream, to generate an eighth product stream;

ninth combining circuitry for additively combining said seventh and eighth product streams to generate ninth combining results;

a ninth integrator for integrating said ninth combining results together with a ninth integrator initial integration value, thus to generate a ninth integrator output signal;

circuitry for computing the energy of said ninth integrator output signal, the result of computing the energy of said ninth integrator output signal being included in said first error signal;

tenth combining circuitry for differentially combining said seventh and eighth product streams to generate tenth combining results, the combining by said tenth combining circuitry being additive combining when an indication is supplied that bits of sync data or run-up data are being supplied from said fourth parallel-to-serial converter, and the combining by said tenth combining circuitry being differential combining when no indication is supplied that bits of sync data or run-up data are being supplied from said fourth parallel-to-serial converter;

a tenth integrator for integrating said tenth combining results together with a tenth integrator initial integration value, thus to generate a tenth integrator output signal, said ninth and tenth integrator initial integration values being the same and equaling the one of said ninth and tenth integrator output signals for the channel word previously selected for recording;

circuitry for computing the energy of said tenth integrator output signal, the result of computing the energy of said tenth integrator output signal being included in said second error signal.

18. Digital signal recording apparatus as claimed in claim 15 for recording each of said first set of tracks with I-NRZI modulation having spectral dips on each side of said first frequency, to which end said control signal generator further comprises:

circuitry for generating even-occurring ones of successive samples of a square wave system function of said first frequency and combining them with respective unit quantities, the polarities of which are determined by the bits of each said serial-bit even channel word supplied from said time-share multiplexer, to generate a first multiplicand stream;

circuitry for generating odd-occurring ones of successive samples of a square wave system function of said first frequency and combining them with respective unit quantities, the polarities of which are determined by the bits of each said serial-bit odd channel word supplied from said time-share multiplexer, to generate a second multiplicand stream;

circuitry for generating even-occurring ones of successive samples of a sampled-data sine wave system function of said first frequency and multiplying them by respective samples of said first multiplicand stream, to generate a first product stream;

circuitry for generating odd-occurring ones of successive samples of a sampled-data sine wave system function of said first frequency and multiplying them by respective samples of said first multiplicand stream, to generate a second product stream;

third combining circuitry for additively combining said first and second product streams to generate third combining results;

a third integrator for integrating said third combining results together with a third integrator initial integration value, thus to generate a third integrator output signal;

circuitry for computing the energy of said third integrator output signal, the result of computing the energy of said third integrator output signal being included in said first error signal;

fourth combining circuitry for differentially combining said first and second product streams to generate fourth combining results, the combining by said fourth combining circuitry being additive combining when an indication is supplied that bits of sync data or run-up data are being supplied from said fourth parallel-to-serial converter, and the combining by said fourth combining circuitry being differential combining when no indication is supplied that bits of sync data or run-up data are being supplied from said fourth parallel-to-serial converter;

a fourth integrator for integrating said fourth combining results together with a fourth integrator initial integration value, thus to generate a fourth integrator output signal, said third and fourth integrator initial integration values being the same and equaling the one of said third and fourth integrator output signals for the channel word previously selected for recording;

circuitry for computing the energy of said fourth integrator output signal, the result of computing the energy of said fourth integrator output signal being included in said second error signal;

circuitry for generating even-occurring ones of successive samples of a sampled-data cosine wave system function of said first frequency and multiplying them by respective samples of said second multiplicand stream, to generate a third product stream;

circuitry for generating odd-occurring ones of successive samples of a sampled-data cosine wave system function of said first frequency and multiplying them by respective samples of said second multiplicand stream, to generate a fourth product stream;

fifth combining circuitry for additively combining said third and fourth product streams to generate fifth combining results;

a fifth integrator for integrating said fifth combining results together with a fifth integrator initial integration value, thus to generate a fifth integrator output signal;

circuitry for computing the energy of said fifth integrator output signal, the result of computing the energy of said fifth integrator output signal being included in said first error signal;

sixth combining circuitry for differentially combining said third and fourth product streams to generate sixth combining results, the combining by said sixth combining circuitry being additive combining when an indication is supplied that bits of sync data or run-up data are being supplied from said fourth parallel-to-serial converter, and the combining by said sixth combining circuitry being differential combining when no indication is supplied that bits of sync data or run-up data are being supplied from said fourth parallel-to-serial converter;

a sixth integrator for integrating said sixth combining results together with a sixth integrator initial integration value, thus to generate a sixth integrator output signal, said fifth and sixth integrator initial integration values being the same and equaling the one of said fifth and sixth integrator output signals for the channel word previously selected for recording; and circuitry for computing the energy of said sixth integrator output signal, the result of computing the energy of said sixth integrator output signal being included in said second error signal.

19. Digital signal recording apparatus as claimed in claim 14, wherein said control signal generator further comprises:

circuitry for generating said first and second control signals in response to whether or not a first error signal is exceeded in amplitude by a second error signal;

circuitry for generating even-occurring ones of successive samples of a sampled-data sine wave system function of a notch frequency and multiplying them by respective unit quantities, the polarities of which are determined by the bits of each said serial-bit even channel word supplied from said time-share multiplexer, to generate a first product stream;

circuitry for generating odd-occurring ones of successive samples of a sampled-data sine wave system function of said notch frequency and multiplying them by respective unit quantities, the polarities of which are determined by the bits of each said serial-bit odd channel word supplied from said time-share multiplexer, to generate a second product stream;

third combining circuitry for additively combining said first and second product streams to generate third combining results;

a third integrator for integrating said third combining results together with a third integrator initial integration value, thus to generate a third integrator output signal;

circuitry for computing the energy of said third integrator output signal, the result of computing the energy of said third integrator output signal being included in said first error signal;

fourth combining circuitry for differentially combining said first and second product streams to generate fourth combining results, the combining by said fourth combining circuitry being additive combining when an indication is supplied that bits of sync data or run-up data are being supplied from said fourth parallel-to-serial converter, and the combining by said fourth combining circuitry being differential combining when no indication is supplied that bits of sync data or run-up data are being supplied from said fourth parallel-to-serial converter;

a fourth integrator for integrating said fourth combining results together with a fourth integrator initial integration value, thus to generate a fourth integrator output signal, said third and fourth integrator initial integration values being the same and equaling the one of said third and fourth integrator output signals for the channel word previously selected for recording;

circuitry for computing the energy of said fourth integrator output signal, the result of computing the energy of said fourth integrator output signal being included in said second error signal;

circuitry for generating even-occurring ones of successive samples of a sampled-data cosine wave system function of said notch frequency and multiplying them by respective unit quantities, the polarities of which are determined by the bits of each said serial-bit even channel word supplied from said time-share multiplexer, to generate a third product stream;

circuitry for generating odd-occurring ones of successive samples of a sampled-data cosine wave system function of said notch frequency and multiplying them by respective unit quantities, the polarities of which are determined by the bits of each said serial-bit odd channel word supplied from said time-share multiplexer, to generate a fourth product stream;

fifth combining circuitry for additively combining said third and fourth product streams to generate fifth combining results;

a fifth integrator for integrating said fifth combining results together with a fifth integrator initial integration value, thus to generate a fifth integrator output signal;

circuitry for computing the energy of said fifth integrator output signal, the result of computing the energy of said fifth integrator output signal being included in said first error signal;

sixth combining circuitry for differentially combining said third and fourth product streams to generate sixth combining results, the combining by said sixth combining circuitry being additive combining when an indication is supplied that bits of sync data or run-up data are being supplied from said fourth parallel-to-serial converter, and the combining by said sixth combining circuitry being differential combining when no indication is supplied that bits of sync data or run-up data are being supplied from said fourth parallel-to-serial converter;

a sixth integrator for integrating said sixth combining results together with a sixth integrator initial integration value, thus to generate a sixth integrator output signal, said fifth and sixth integrator initial integration values being the same and equaling the one of said fifth and sixth integrator output signals for the channel word previously selected for recording; and circuitry for computing the energy of said sixth integrator output signal, the result of computing the energy of said sixth integrator output signal being included in said second error signal.

20. Digital signal recording apparatus for interleaved non-return to-zero, invert-on-ONEs (I-NRZI) modulation, said digital signal recording apparatus comprising:

a recorder for recording said I-NRZI modulation on a recording medium, in response to an I-NRZI code received by said recorder;

a source of information words;

a bit inserter for affixing a single-bit prefix to each information word, said single-bit prefixes each having the same bit value as the others;

a 2T precoder, for generating as a first precoder output signal therefrom I-NRZI code of a first type in response to said information words with their said single-bit prefixes affixed thereto, proceeding from initial values specified by a first control signal, a respective channel word being generated during each of successive channel word intervals of a prescribed duration, one set of alternate bits of each channel word of said first precoder output signal forming a respective odd channel word and the other set of alternate bits of each channel word of said first precoder output signal forming a respective even channel word;

bit complementing circuitry for bit complementing each odd channel word in the first precoder output signal means for generating a second precoder output signal from said first precoder output signal by interleaving the bits of said even channel words with the complemented bits of said odd channel words;

a control signal generator responsive to said first precoder output signal for generating said first control signal and a second control signal, which said first and second control signals indicate which of said first and second precoder output signals should be selected for inclusion in said I-NRZI code in order to minimize deviation of said I-NRZI modulation from a spectral response prescribed for current recording, any change in value of said second control signal occurring only at multiples of the duration of said channel word intervals; and means, responsive to said second control signal indicating which of said first and second precoder output signals should be selected for inclusion in said I-NRZI code, for selecting the indicated precoder output signal for application in serial-bit format to said recorder.

21. Digital signal recording apparatus as set forth in claim 20, wherein said 2T precoder is of parallel-bit type.

22. Digital signal recording apparatus as set forth in claim 21, wherein said 2T precoder is operable to generate said first precoder output signal as a parallel-bit first precoder output signal, wherein said means for generating a second precoder output signal is operable to generate said second precoder output signal as a parallel-bit second precoder output signal, and wherein said means for selecting the indicated precoder output signal for application in serial-bit format to said recorder comprises:

a first parallel-to-serial converter for converting said parallel-bit first precoder output signal to a serial-bit first precoder output signal;

a second parallel-to-serial converter for converting said parallel-bit second precoder output signal to a serial-bit second precoder output signal; and a selector responding to said second control signal for selecting one of said serial-bit first precoder output signal and serial-bit second precoder output signal for application to said recorder.

23. Digital signal recording apparatus as set forth in claim 22, further comprising:

a third parallel-to-serial converter for converting each said even channel word extracted from said parallel-bit first precoder output signal to a serial-bit even channel word supplied to said control signal generator as a first input signal thereto; and a fourth parallel-to-serial converter for converting each said odd channel word extracted from said parallel-bit first precoder output signal to a serial-bit odd channel word supplied to said control signal generator as a second input signal thereto.

24. Digital signal recording apparatus as set forth in claim 21, further comprising:

an even-channel-word parallel-to-serial converter for converting each said even channel word extracted from said parallel-bit first precoder output signal to a serial-bit even channel word supplied to said control signal generator as a first input signal thereto; and an odd-channel-word parallel-to-serial converter for converting each said odd channel word extracted from said parallel-bit first precoder output signal to a serial-bit odd channel word supplied to said control signal generator as a second input signal thereto.

25. Digital signal recording apparatus as claimed in claim 24, wherein said control signal generator comprises:

circuitry for generating said first and second control signals in response to whether or not a first error signal is exceeded in amplitude by a second error signal;

first combining circuitry for additively combining unit quantities, the polarities of which are determined by the bits of each said serial-bit odd channel word supplied from said odd-channel-word parallel-to serial-converter, with further unit quantities, the polarities of which are determined the bits of said serial-bit even channel word concurrently supplied from said even-channel-word parallel-to-serial converter, to generate first combining results;

a first integrator for integrating said first combining results together with a first integrator initial integration value, thus to generate a first integrator output signal equal to a first running digital sum value as would obtain if a channel word of said first kind were next selected for recording;

second combining circuitry for differentially combining said unit quantities, the polarities of which are determined by the bits of each said serial-bit odd channel word supplied from said odd-channel-word parallel-to-serial converter, with said further unit quantities, the polarities of which are determined the bits of said serial-bit even channel word concurrently supplied from said even-channel-word parallel-to-serial converter, to generate second combining results;

a second integrator for integrating said second combining results together with a second integrator initial integration value, thus to generate a second integrator output signal equal to a second running digital sum value as would obtain if a channel word of said second kind were next selected for recording, said first and second integrator initial integration values being the same and equaling the one of said first and second integrator output signals for the channel word previously selected for recording;

circuitry for computing the energy of any deviation of said first running digital sum from a prescribed running digital sum value for said one of said tracks being currently recorded, the result of computing the energy of any such deviation of first running digital sum being included in said first error signal; and circuitry for computing the energy of any deviation of second running digital sum from said prescribed running digital sum value for said one of said tracks being currently recorded, the result of computing the energy of any deviation of said second running digital sum being included in said second error signal.

26. Digital signal recording apparatus as claimed in claim 25, wherein said control signal generator further comprises:

circuitry for generating a triangular wave of a prescribed first frequency as said prescribed running digital sum value when each of a first set of tracks is recorded.

27. Digital signal recording apparatus as claimed in claim 26 for recording each of said first set of tracks with I-NRZI modulation with a spectral notch at a second frequency having real and imaginary phases, to which end said control signal generator further comprises:

circuitry for generating even-occurring ones of successive samples of a sampled-data sine wave system function of said second frequency and multiplying them by respective unit quantities, the polarities of which are determined by the bits of each said serial-bit even channel word supplied from said even-channel-word parallel-to-serial converter, to generate a first product stream;

circuitry for generating odd-occurring ones of successive samples of a sampled-data sine wave system function of said second frequency and multiplying them by respective unit quantities, the polarities of which are determined by the bits of each said serial-bit odd channel word supplied from said odd-channel-word parallel-to-serial converter, to generate a second product stream;

third combining circuitry for additively combining said first and second product streams to generate third combining results;

a third integrator for integrating said third combining results together with a third integrator initial integration value, thus to generate a third integrator output signal;

circuitry for computing the energy of said third integrator output signal, the result of computing the energy of said third integrator output signal being included in said first error signal;

fourth combining circuitry for differentially combining said first and second product streams to generate fourth combining results;

a fourth integrator for integrating said fourth combining results together with a fourth integrator initial integration value, thus to generate a fourth integrator output signal, said third and fourth integrator initial integration values being the same and equaling the one of said third and fourth integrator output signals for the channel word previously selected for recording;

circuitry for computing the energy of said fourth integrator output signal, the result of computing the energy of said fourth integrator output signal being included in said second error signal;

circuitry for generating even-occurring ones of successive samples of a sampled-data cosine wave system function of said second frequency and multiplying them by respective unit quantities, the polarities of which are determined by the bits of each said serial-bit even channel word supplied from said even-channel-word parallel-to-serial converter, to generate a third product stream;

circuitry for generating odd-occurring ones of successive samples of a sampled-data cosine wave system function of said second frequency and multiplying them by respective unit quantities, the polarities of which are determined by the bits of each said serial-bit odd channel word supplied from said odd-channel-word parallel-to-serial converter, to generate a fourth product stream;

fifth combining circuitry for additively combining said third and fourth product streams to generate fifth combining results;

a fifth integrator for integrating said fifth combining results together with a fifth integrator initial integration value, thus to generate a fifth integrator output signal;

circuitry for computing the energy of said fifth integrator output signal, the result of computing the energy of said fifth integrator output signal being included in said first error signal;

sixth combining circuitry for differentially combining said third and fourth product streams to generate sixth combining results;

a sixth integrator for integrating said sixth combining results together with a sixth integrator initial integration value, thus to generate a sixth integrator output signal, said fifth and sixth integrator initial integration values being the same and equaling the one of said fifth and sixth integrator output signals for the channel word previously selected for recording; and circuitry for computing the energy of said sixth integrator output signal, the result of computing the energy of said sixth integrator output signal being included in said second error signal.

28. Digital signal recording apparatus as claimed in claim 27 for recording each of said first set of tracks with I-NRZI modulation having spectral dips on each side of said first frequency, to which end said control signal generator further comprises:

circuitry for generating even-occurring ones of successive samples of a square wave system function of said first frequency and combining them with respective unit quantities, the polarities of which are determined by the bits of each said serial-bit even channel word supplied from said even-channel-word parallel-to-serial converter, to generate a first multiplicand stream;

circuitry for generating odd-occurring ones of successive samples of a square wave system function of said first frequency and combining them with respective unit quantities, the polarities of which are determined by the bits of each said serial-bit odd channel word supplied from said odd-channel-word parallel-to-serial converter, to generate a second multiplicand stream;

circuitry for generating even-occurring ones of successive samples of a sampled-data sine wave system function of said first frequency and multiplying them by respective samples of said first multiplicand stream, to generate a fifth product stream;

circuitry for generating odd-occurring ones of successive samples of a sampled-data sine wave system function of said first frequency and multiplying them by respective samples of said first multiplicand stream, to generate a sixth product stream;

seventh combining circuitry for additively combining said fifth and sixth product streams to generate seventh combining results;

a seventh integrator for integrating said seventh combining results together with a seventh integrator initial integration value, thus to generate a seventh integrator output signal;

circuitry for computing the energy of said seventh integrator output signal, the result of computing the energy of said seventh integrator output signal being included in said first error signal;

eighth combining circuitry for differentially combining said fifth and sixth product streams product streams to generate eighth combining results;

an eighth integrator for integrating said eighth combining results together with an eighth integrator initial integration value, thus to generate an eighth integrator output signal, said seventh and eighth integrator initial integration values being the same and equaling the one of said seventh and eighth integrator output signals for the channel word previously selected for recording;

circuitry for computing the energy of said eighth integrator output signal, the result of computing the energy of said eighth integrator output signal being included in said second error signal;

circuitry for generating even-occurring ones of successive samples of a sampled-data cosine wave system function of said first frequency and multiplying them by respective samples of said second multiplicand stream, to generate a seventh product stream;

circuitry for generating odd-occurring ones of successive samples of a sampled-data cosine wave system function of said first frequency and multiplying them by respective samples of said second multiplicand stream, to generate an eighth product stream;

ninth combining circuitry for additively combining said seventh and eighth product streams to generate ninth combining results;

a ninth integrator for integrating said ninth combining results together with a ninth integrator initial integration value, thus to generate a ninth integrator output signal;

circuitry for computing the energy of said ninth integrator output signal, the result of computing the energy of said ninth integrator output signal being included in said first error signal;

tenth combining circuitry for differentially combining said seventh and eighth product streams to generate tenth combining results;

a tenth integrator for integrating said tenth combining results together with a tenth integrator initial integration value, thus to generate a tenth integrator output signal, said ninth and tenth integrator initial integration values being the same and equaling the one of said ninth and tenth integrator output signals for the channel word previously selected for recording;

circuitry for computing the energy of said tenth integrator output signal, the result of computing the energy of said tenth integrator output signal being included in said second error signal.

29. Digital signal recording apparatus as claimed in claim 26 for recording each of said first set of tracks with I-NRZI modulation having spectral dips on each side of said first frequency, to which end said control signal generator further comprises:

circuitry for generating even-occurring ones of successive samples of a square wave system function of said first frequency and combining them with respective unit quantities, the polarities of which are determined by the bits of each said serial-bit even channel word supplied from said even-channel-word parallel-to-serial converter, to generate a first multiplicand stream;

circuitry for generating odd-occurring ones of successive samples of a square wave system function of said first frequency and combining them with respective unit quantities, the polarities of which are determined by the bits of each said serial-bit odd channel word supplied from said odd-channel-word parallel-to-serial converter, to generate a second multiplicand stream;

circuitry for generating even-occurring ones of successive samples of a sampled-data sine wave system function of said first frequency and multiplying them by respective samples of said first multiplicand stream, to generate a first product stream;

circuitry for generating odd-occurring ones of successive samples of a sampled-data sine wave system function of said first frequency and multiplying them by respective samples of said first multiplicand stream, to generate a second product stream;

third combining circuitry for additively combining said first and second product streams to generate third combining results;

a third integrator for integrating said third combining results together with a third integrator initial integration value, thus to generate a third integrator output signal;

circuitry for computing the energy of said third integrator output signal, the result of computing the energy of said third integrator output signal being included in said first error signal;

fourth combining circuitry for differentially combining said first and second product streams to generate fourth combining results;

a fourth integrator for integrating said fourth combining results together with a fourth integrator initial integration value, thus to generate a fourth integrator output signal, said third and fourth integrator initial integration values being the same and equaling the one of said third and fourth integrator output signals for the channel word previously selected for recording;

circuitry for computing the energy of said fourth integrator output signal, the result of computing the energy of said fourth integrator output signal being included in said second error signal;

circuitry for generating even-occurring ones of successive samples of a sampled-data cosine wave system function of said first frequency and multiplying them by respective samples of said second multiplicand stream, to generate a third product stream;

circuitry for generating odd-occurring ones of successive samples of a sampled-data cosine wave system function of said first frequency and multiplying them by respective samples of said second multiplicand stream, to generate a fourth product stream;

fifth combining circuitry for additively combining said third and fourth product streams to generate fifth combining results;

a fifth integrator for integrating said fifth combining results together with a fifth integrator initial integration value, thus to generate a fifth integrator output signal;

circuitry for computing the energy of said fifth integrator output signal, the result of computing the energy of said fifth integrator output signal being included in said first error signal;

sixth combining circuitry for differentially combining said third and fourth product streams to generate sixth combining results;

a sixth integrator for integrating said sixth combining results together with a sixth integrator initial integration value, thus to generate a sixth integrator output signal, said fifth and sixth integrator initial integration values being the same and equaling the one of said fifth and sixth integrator output signals for the channel word previously selected for recording; and circuitry for computing the energy of said sixth integrator output signal, the result of computing the energy of said sixth integrator output signal being included in said second error signal.

30. Digital signal recording apparatus as claimed in claim 25, wherein said control signal generator further comprises:

circuitry for generating said first and second control signals in response to whether or not a first error signal is exceeded in amplitude by a second error signal;

circuitry for generating even-occurring ones of successive samples of a sampled-data sine wave system function of a notch frequency and multiplying them by respective unit quantities, the polarities of which are determined by the bits of each said serial-bit even channel word supplied from said even-channel-word parallel-to-serial converter, to generate a first product stream;

circuitry for generating odd-occurring ones of successive samples of a sampled-data sine wave system function of said notch frequency and multiplying them by respective unit quantities, the polarities of which are determined by the bits of each said serial-bit odd channel word supplied from said odd-channel-word parallel-to-serial converter, to generate a second product stream;

third combining circuitry for additively combining said first and second product streams to generate third combining results;

a third integrator for integrating said third combining results together with a third integrator initial integration value, thus to generate a third integrator output signal;

circuitry for computing the energy of said third integrator output signal, the result of computing the energy of said third integrator output signal being included in said first error signal;

fourth combining circuitry for differentially combining said first and second product streams to generate fourth combining results;

a fourth integrator for integrating said fourth combining results together with a fourth integrator initial integration value, thus to generate a fourth integrator output signal, said third and fourth integrator initial integration values being the same and equaling the one of said third and fourth integrator output signals for the channel word previously selected for recording;

circuitry for computing the energy of said fourth integrator output signal, the result of computing the energy of said fourth integrator output signal being included in said second error signal;

circuitry for generating even-occurring ones of successive samples of a sampled-data cosine wave system function of said notch frequency and multiplying them by respective unit quantities, the polarities of which are determined by the bits of each said serial-bit even channel word supplied from said even-channel-word parallel-to-serial converter, to generate a third product stream;

circuitry for generating odd-occurring ones of successive samples of a sampled-data cosine wave system function of said notch frequency and multiplying them by respective unit quantities, the polarities of which are determined by the bits of each said serial-bit odd channel word supplied from said odd-channel-word parallel-to-serial converter, to generate a fourth product stream;

fifth combining circuitry for additively combining said third and fourth product streams to generate fifth combining results;

a fifth integrator for integrating said fifth combining results together with a fifth integrator initial integration value, thus to generate a fifth integrator output signal;

circuitry for computing the energy of said fifth integrator output signal, the result of computing the energy of said fifth integrator output signal being included in said first error signal;

sixth combining circuitry for differentially combining said third and fourth product streams to generate sixth combining results;

a sixth integrator for integrating said sixth combining results together with a sixth integrator initial integration value, thus to generate a sixth integrator output signal, said fifth and sixth integrator initial integration values being the same and equaling the one of said fifth and sixth integrator output signals for the channel word previously selected for recording; and circuitry for computing the energy of said sixth integrator output signal, the result of computing the energy of said sixth integrator output signal being included in said second error signal.

* * * * *